United States Patent
Havre et al.

(10) Patent No.: US 10,311,173 B2
(45) Date of Patent: Jun. 4, 2019

(54) MULTIPHASE FLOW SIMULATOR SUB-MODELING

(71) Applicant: Schlumberger Technology Corporation, Sugar Land, TX (US)

(72) Inventors: Kjetil Havre, Kjeller (NO); Jon-Terje Lilleby, Kjeller (NO); Stian Henriksen, Kjeller (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 457 days.

(21) Appl. No.: 14/873,895

(22) Filed: Oct. 2, 2015

(65) Prior Publication Data

US 2016/0098502 A1    Apr. 7, 2016

Related U.S. Application Data

(60) Provisional application No. 62/059,626, filed on Oct. 3, 2014.

(51) Int. Cl.
*G06F 17/50* (2006.01)
*E21B 43/00* (2006.01)

(52) U.S. Cl.
CPC .......... *G06F 17/5009* (2013.01); *E21B 43/00* (2013.01)

(58) Field of Classification Search
CPC .............................. G06F 17/5009; E21B 43/00
USPC ............................................. 703/9, 10; 702/6
See application file for complete search history.

(56) References Cited

U.S. PATENT DOCUMENTS

| | | | |
|---|---|---|---|
| 6,928,399 B1 | 8/2005 | Watts, III et al. | |
| 8,849,639 B2 | 9/2014 | Brown et al. | |
| 8,964,816 B2 | 2/2015 | Pennisi | |
| 2002/0169785 A1 | 11/2002 | Netemeyer et al. | |
| 2007/0112547 A1* | 5/2007 | Ghorayeb | E21B 41/00 703/10 |
| 2007/0179766 A1* | 8/2007 | Cullick | E21B 43/00 703/10 |
| 2010/0049490 A1* | 2/2010 | Watters | E21B 43/00 703/10 |
| 2014/0207430 A1 | 7/2014 | Li et al. | |
| 2014/0303949 A1 | 10/2014 | Boneti et al. | |
| 2014/0303950 A1 | 10/2014 | Houeto et al. | |
| 2014/0303951 A1 | 10/2014 | Houeto et al. | |
| 2015/0025858 A1 | 1/2015 | Kulkarni et al. | |
| 2016/0063146 A1 | 3/2016 | Bailey et al. | |
| 2016/0154907 A1 | 6/2016 | Halabe et al. | |

OTHER PUBLICATIONS

Haugen, et al., "Simulation of Independent Reservoirs Coupled by Global Production and Injection Constraints", Feb. 12, 1995, Proceedings of the SPE Reservoir Simulation Symposium, pp. 111-123.
Extended European Search Report issued in related EP application 15188313.9 dated Mar. 3, 2016, 8 pages.
First Examination Report issued in related AU application 2015234396 dated Jun. 15, 2016, 3 pages.

(Continued)

*Primary Examiner* — Eunhee Kim
(74) *Attorney, Agent, or Firm* — Gary Gex

(57) ABSTRACT

A method can include receiving a model of a fluid production network where the model includes a plurality of sub-models; synchronizing simulation of the plurality of sub-models with respect to time; and outputting values for fluid flow variables of the model.

19 Claims, 27 Drawing Sheets

(56) References Cited

OTHER PUBLICATIONS

Examination Report for the equivalent Australian patent application 2015234396 dated Jun. 5, 2017.
"Submodelling guide," Schlumberger, OLGA dynamic multiphase flow simulator, Jan. 2014.
Examination Report for the equivalent Australian patent application 2017204052 dated May 22, 2018.

* cited by examiner

Submodel Connections 2010

| | Flow | Signal | | |
|---|---|---|---|---|
| | Flow Out | | Flow In | |
| | WellA.FROM-A | | PipelineABCD.A-INTO-F5 | ▶ |
| | WellC.FROM-C | | PipelineABCD.C-INTO-F4 | ▶ |
| | WellB.FROM-B | | PipelineABCD.B-INTO-F4 | ▶ |
| | WellD.FROM-D | | PipelineABCD.D-INTO-F2 | |

OK    Cancel

MULTIPHASE FLOW SIMULATOR SUB-MODELING

RELATED APPLICATIONS

This application claims priority to and the benefit of a U.S. Provisional application having Ser. No. 62/059,626, filed 3 Oct. 2014, which is incorporated by reference herein.

BACKGROUND

Production systems can provide for transportation of oil and gas fluids from well locations to processing facilities, etc. As an example, a system may include a substantial number of flowlines and pieces of equipment, for example, interconnected at junctions to form a network. Flow through such a network may be understood better through modeling and simulation.

SUMMARY

A method can include receiving a model of a fluid production network where the model includes a plurality of sub-models; synchronizing simulation of the plurality of sub-models with respect to time; and outputting values for fluid flow variables of the model. A system can include a processor; memory accessible by the processor; and modules that include processor-executable instructions where the instructions include instructions to instruct the system to receive a model of a fluid production network where the model includes a plurality of sub-models; synchronize simulation of the plurality of sub-models with respect to time; and output values for fluid flow variables of the model. One or more computer-readable storage media can include computer-executable instructions executable by a computer where the instructions include instructions to: receive a model of a fluid production network where the model includes a plurality of sub-models; synchronize simulation of the plurality of sub-models with respect to time; and output values for fluid flow variables of the model.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 20 illustrates an example of a graphical user interface;

FIG. 24 illustrates an example of a graphical user interface;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
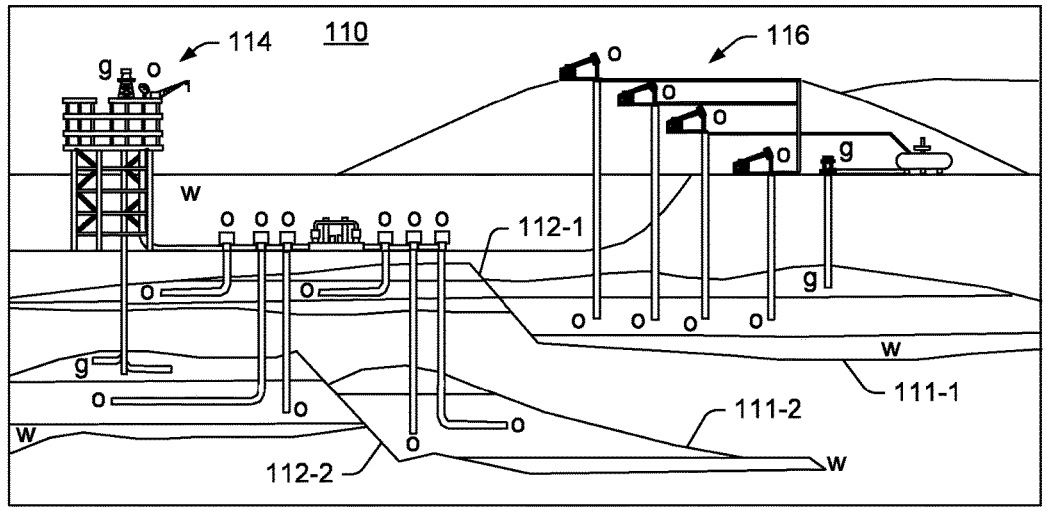
FIG. 1 illustrates an example field system that includes various components, an example of a method and an example of a device or system.
Figure 1:
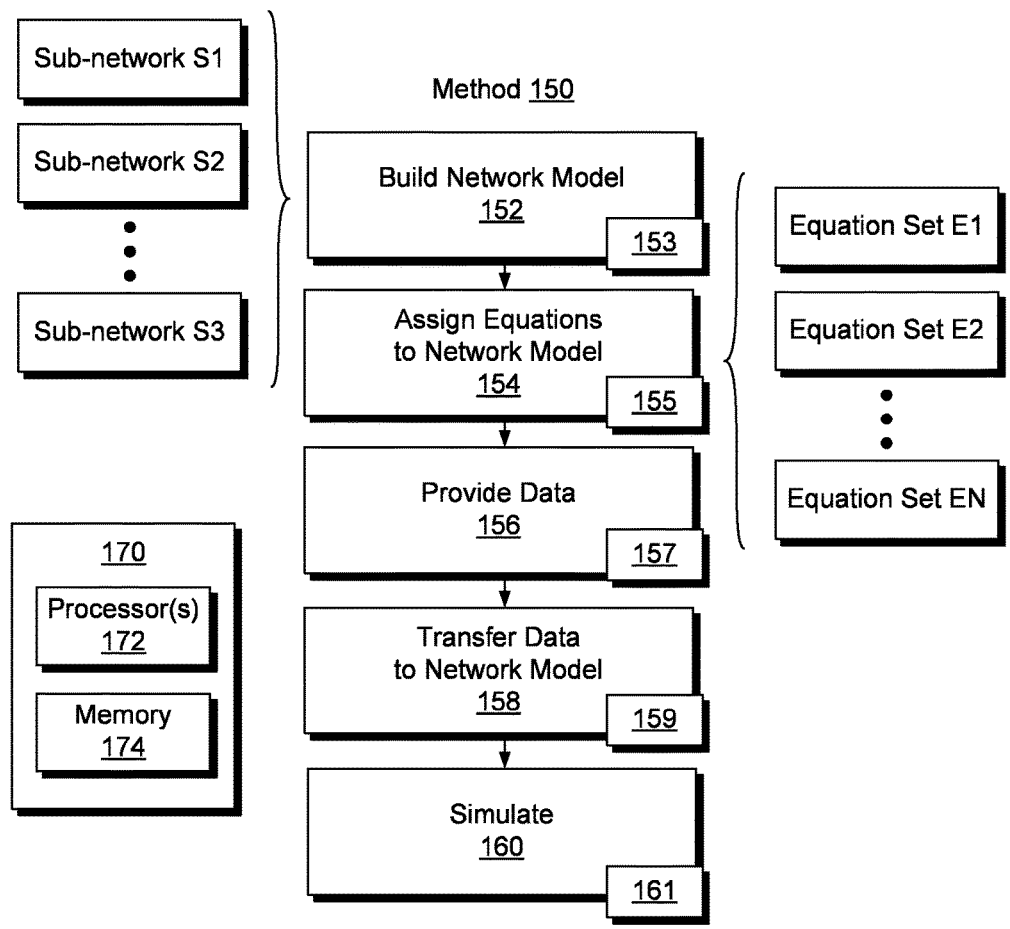

FIG. 1 shows an example of a geologic environment 110 that includes reservoirs 111-1 and 111-2, which may be faulted by faults 112-1 and 112-2, an example of a method 150 and an example of a device or system 170. FIG. 1 also shows some examples of offshore equipment 114 for oil and gas operations related to the reservoirs 111-1 and 111-2 and onshore equipment 116 for oil and gas operations related to the reservoir 111-1.

As an example, a model may be made that models a geologic environment in combination with equipment, wells, etc. For example, a model may be a flow simulation model for use by a simulator to simulate flow in an oil, gas or oil and gas production system (e.g., an optionally other fluids, solids, etc.). Such a flow simulation model may include equations, for example, to model multiphase flow from a reservoir to a wellhead, from a wellhead to a reservoir, etc. A flow simulation model may also include equations that account for flowline and surface facility performance, for example, to perform a comprehensive production system analysis.

As an example, a flow simulation model may be a network model that includes various sub-networks specified using nodes, segments, branches, etc. As an example, a flow simulation model may be specified in a manner that provides for modeling of branched segments, multilateral segments, complex completions, intelligent downhole controls, etc. As an example, one or more portions of a production network (e.g., optionally sub-networks, etc.) or a group of signal components and/or controllers may be modeled as sub-models.

As an example, a system may provide for transportation of oil and gas fluids from well locations to processing facilities and may represent a substantial investment in infrastructure with both economic and environmental impact. Simulation of such a system, which may include hundreds or thousands of flow lines and production equipment interconnected at junctions to form a network, can involve multiphase flow science and, for example, use of engineering and mathematical techniques for large systems of equations. As an example, a system may include one or more separators, for example, to separate fluids (e.g., consider a water/oil separator, etc.).

As an example, a flow simulation model may include equations for performing nodal analysis, pressure-volume-temperature (PVT) analysis, gas lift analysis, erosion analysis, corrosion analysis, production analysis, injection analysis, etc. In such an example, one or more analyses may be based, in part, on a simulation of flow in a modeled network.

As to nodal analysis, it may provide for evaluation of well performance, for making decisions as to completions, etc. A nodal analysis may provide for an understanding of behavior of a system and optionally sensitivity of a system (e.g., production, injection, production and injection). For example, a system variable may be selected for investigation and a sensitivity analysis performed. Such an analysis may include plotting inflow and outflow of fluid at a nodal point or nodal points in the system, which may indicate where certain opportunities exist (e.g., for injection, for production, etc.).

A modeling framework may include modules to facilitate generation of a flow simulation model. For example, a module may provide for modeling completions for vertical wells, completions for horizontal wells, completions for fractured wells, etc. A modeling framework may include modules for particular types of equations, for example, black-oil equations, equation-of-state (EOS) equations, etc. A modeling framework may include modules for artificial lift, for example, to model fluid injection, fluid pumping, etc. As an example, consider a module that includes features for modeling one or more electric submersible pumps (ESPs) (e.g., based in part on pump performance curves, motors, cables, etc.).

As an example, an analysis using a flow simulation model may be a network analysis to: identify production bottlenecks and constraints; assess benefits of new wells, additional pipelines, compression systems, etc.; calculate deliverability from field gathering systems; predict pressure and temperature profiles through flow paths; or plan full-field development.

As an example, a flow simulation model may provide for analyses with respect to future times, for example, to allow for optimization of production equipment, injection equipment, etc. As an example, consider an optimal time-based and conditional-event logic representation for daily field development operations that can be used to evaluate drilling of new developmental wells, installing additional processing facilities over time, choke-adjusted wells to meet production and operating limits, shutting in of depleting wells as reservoir conditions decline, etc.

As to equations, sets of conservation equations for mass momentum and energy describing single, two or three phase flow may be utilized (e.g., according to one or more of a LEDAFLOW™ (Kongsberg Oil & Gas Technologies AS, Sandvika, Norway), OLGA™ model (Schlumberger Ltd, Houston, Tex.), TUFFP unified mechanistic models (Tulsa University Fluid Flow Projects, Tulsa, Okla.), etc.).

As to the method 150 of FIG. 1, it can include a build block 152 for building a network model that represents a production system for fluid; an assignment block 154 for assigning equations to sub-networks in the network model (e.g., where a sub-network may optionally be assigned equations formulated for solving for pressure and momentum implicitly and simultaneously, conservation mass and energy/temperature in separate stages, etc.), a provision block 156 for providing data; a transfer block 158 for transferring the data to the network model; and a simulation block 160 for simulating physical phenomena associated with the production system using the network model to provide simulation results.

The method 150 is shown in FIG. 1 in association with various computer-readable media (CRM) blocks 153, 155, 157, 159 and 161. Such blocks generally include instructions suitable for execution by one or more processors (or processing cores) 172 to instruct the computing device or system 170 to perform one or more actions. While various blocks are shown, a single medium may be configured with instructions to allow for, at least in part, performance of various actions of the method 150. As an example, a computer-readable medium (CRM) may be a computer-readable storage medium that is not a carrier wave, for example, such as a memory device 174 of the computing device or system 170, where the memory device 174 includes memory.

A production system can include equipment, for example, where a piece of equipment of the production system may be represented in a sub-network of a network model (e.g., optionally as a sub-model or sub-models, etc.) and, for example, assigned equations formulated to represent the piece of equipment. As an example, a piece of equipment may include an electric motor operatively coupled to a mechanism to move fluid (e.g., a pump, compressor, etc.). As an example, a piece of equipment may include a heater coupled to a power source, a fuel source, etc. (e.g., consider a steam generator). As an example, a piece of equipment may include a conduit for delivery of fluid where the fluid may be for delivery of heat energy (e.g., consider a steam injector). As an example, a piece of equipment may include a conduit for delivery of a substance (e.g., a chemical, a proppant, etc.).

As an example, a sub-network may be assigned equations formulated to represent fluid at or near a critical point, to represent heavy oil, to represent steam, to represent water or one or more other fluids (e.g., optionally subject to certain physical phenomena such as pressure, temperature, etc.).

As an example, a system can include a processor; a memory device having memory accessible by the processor; and one or more modules that include processor-executable instructions stored in the memory of the memory device, the instructions executable to instruct the system to: build a network model that represents a production system for fluid, assign equations to sub-networks in the network model, provide data, transfer the data to the network model, and simulate physical phenomena associated with the production system using the network model to provide simulation results.

As an example, a system can include a sub-network assigned equations formulated for steam associated with equipment for an enhanced oil recovery (EOR) process (e.g., steam-assisted gravity drainage (SAGD) and/or other EOR process).

As an example, a system can include a sub-network that represents a piece of equipment of a production system by assigning that sub-network equations formulated to represent the piece of equipment. In such an example, the piece of equipment may include an electric motor operatively coupled to a mechanism to move fluid (e.g., a compressor, a pump, etc.).

As an example, one or more computer-readable media can include computer-executable instructions executable by a computer to instruct the computer to: receive simulation results for physical phenomena associated with a production system modeled by a network model; and analyze the simulation results.

Figure 2:
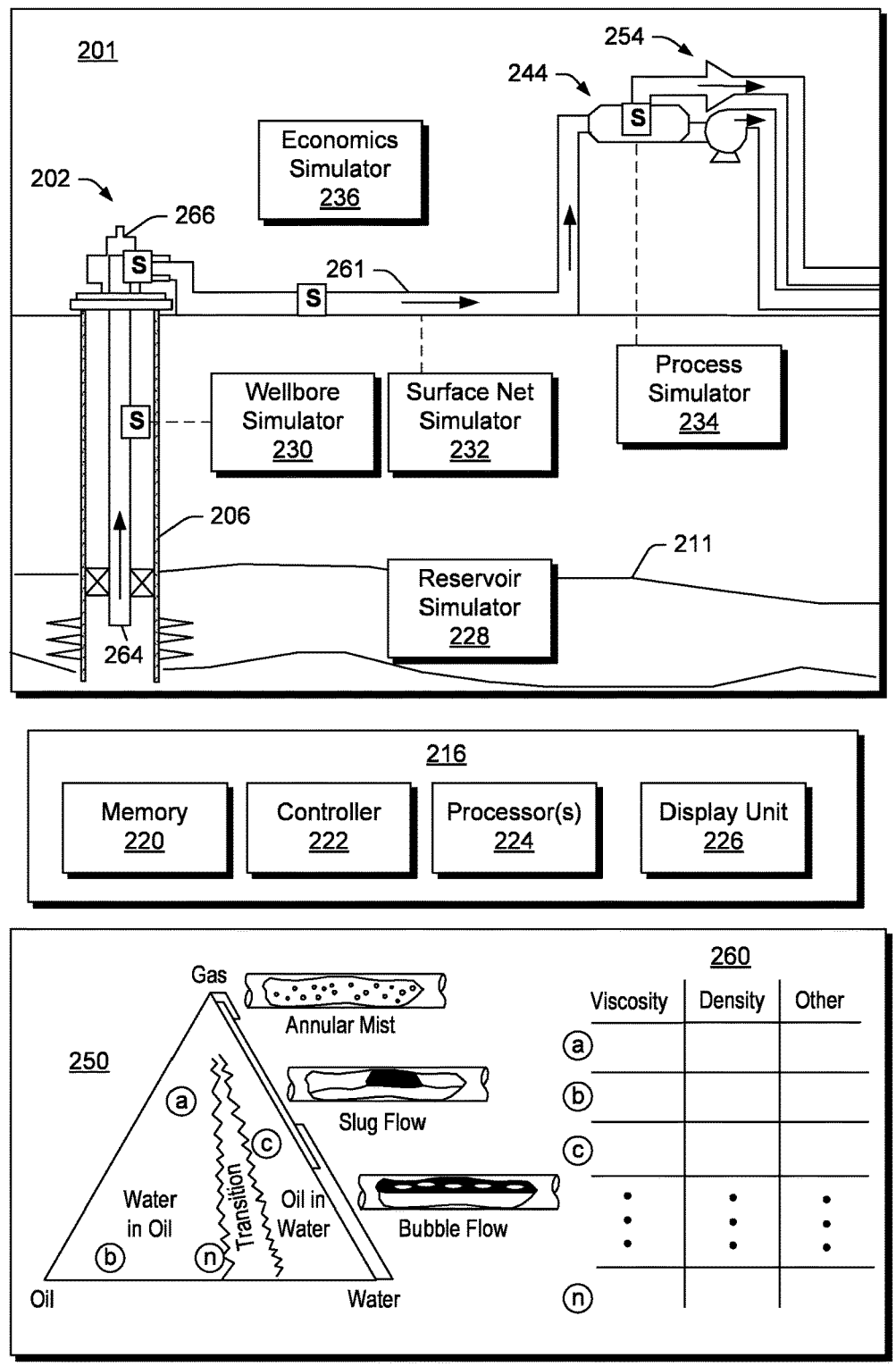
FIG. 2 illustrates an example of a system and an example of a ternary diagram with an example of an associated table of fluid properties.

FIG. 2 shows an example of a schematic view of a portion of a geologic environment 201 that includes equipment and an example of a ternary diagram 250 with an example of a table of associated fluid properties 260. As shown in FIG. 2, the environment 201 includes a wellsite 202 and a network 244. The wellsite 202 includes a wellbore 206 extending into earth as completed and prepared for production of fluid from a reservoir 211.

In the example of FIG. 2, wellbore production equipment 264 extends from a wellhead 266 of the wellsite 202 and to the reservoir 211 to draw fluid to the surface. As shown, the wellsite 202 is operatively connected to the network 244 via a transport line 261. As indicated by various arrows, fluid can flow from the reservoir 211, through the wellbore 206 and onto the network 244. Fluid can then flow from the network 244, for example, to one or more fluid processing facilities.

In the example of FIG. 2, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit 216 (e.g., to instruct the sensors to acquire data, to collect data from the sensors, etc.).

In the example of FIG. 2, the surface unit 216 can include computer facilities, such as a memory device 220, a controller 222, one or more processors 224, and display unit 226 (e.g., for managing data, visualizing results of an analysis, etc.). As an example, data may be collected in the memory device 220 and processed by the processor(s) 224 (e.g., for analysis, etc.). As an example, data may be collected from the sensors (S) and/or by one or more other sources. For example, data may be supplemented by historical data collected from other operations, user inputs, etc. As an example, analyzed data may be used to in a decision making process.

In the example of FIG. 2, a transceiver may be provided to allow communications between the surface unit 216 and one or more pieces of equipment in the environment 201. For example, the controller 222 may be used to actuate mechanisms in the environment 201 via the transceiver, optionally based on one or more decisions of a decision making process. In such a manner, equipment in the environment 201 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit 216 or other unit, system, etc.). As an example, data fed into one or more simulators may be historical data, real time data or combinations thereof. As an example, simulation through one or more simulators may be repeated or adjusted based on the data received.

In the example of FIG. 2, simulators can include a reservoir simulator 228, a wellbore simulator 230, and a surface network simulator 232, a process simulator 234 and an economics simulator 236. As an example, the reservoir simulator 228 may be configured to solve for hydrocarbon flow rate through a reservoir and into one or more wellbores. As an example, the wellbore simulator 230 and surface network simulator 232 may be configured to solve for hydrocarbon flow rate through a wellbore and a surface gathering network of pipelines. As to the process simulator 234, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 236 may be configured to model costs associated with at least part of an operation. For example, consider MERAK™ framework (Schlumberger Limited, Houston, Tex.), which may provide for economic analyses.

In FIG. 2, the ternary diagram 250 includes vertices that represent single-phase gas, oil and water, while the sides represent two phase mixtures (e.g., gas-oil, oil-water and gas-water) and points within the triangle represents a three-phase mixture. The transition region indicates where the liquid fraction changes from water in oil to oil in water and vice versa (e.g., consider emulsions).

The ternary diagram 250 of FIG. 2 also indicates some examples of ranges of multiphase flow regimes, which may be affected by one or more factors such as, for example, temperature, pressure, viscosity, density, flowline orientation, etc. The example flow regimes include annular mist, slug flow and bubble flow; noting that other types of may occur (e.g., stratified, churn, disperse, etc.). Annular mist flow may be characterized by, for example, a layer of liquid on the wall of a pipe and droplets of liquid in a middle gas zone (e.g., mist). Slug flow may be characterized by, for example, a continuous liquid phase and a discontinuous liquid phase that is discontinuous due to separation by pockets of gas. Bubble flow may be characterized by, for example, two continuous liquid phases where at least one of the continuous liquid phases includes gas bubbles. The illustrative graphics of flow regimes in FIG. 2 correspond to flows in approximately horizontal conduits; noting that a conduit may be disposed at an angle other than horizontal and that various factors that can influence flow may depend on angle of a conduit. For example, the angle of a conduit with respect to gravity can have an influence on how fluid flows in the conduit.

The table 260 of FIG. 2 shows viscosity and density as fluid properties. As to one or more other properties, consider, for example, surface tension. As indicated, the table 260 can include information for points specified with respect to the ternary diagram 250. As an example, factors such as pressure, volume and temperature may be considered, for example, as to values of fluid properties, phases, flow regimes, etc.

As an example, information as to flow of fluid may be illustrated as a flow regime map that identifies flow patterns occurring in various parts of a parameter space defined by component flow rates. For example, consider flow rates such as volume fluxes, mass fluxes, momentum fluxes, or one or more other quantities. Boundaries between various flow patterns in a flow regime map may occur where a regime becomes unstable and where growth of such instability causes transition to another flow pattern. As in laminar-to-turbulent transition in single phase flow, multiphase transitions may be rather unpredictable as they may depend on otherwise minor features of the flow, such as the roughness of the walls or the entrance conditions. Thus, as indicated in the ternary diagram 250, flow pattern boundaries may lack distinctiveness and exhibit transition zones.

As to properties, where fluid is single phase (e.g., water, oil or gas), a single value of viscosity may suffice for given conditions. However, where fluid is multiphase, two or more concurrent phases may occupy a flow space within a conduit (e.g., a pipe). In such an example, a single value of viscosity (e.g., or density) may not properly characterize the fluid in that flow space. Accordingly, as an example, a value or values of mixture viscosities may be used, for example, where a mixture value is a function of phase fraction(s) for fluid in a multiphase flow space.

As to surface tension (e.g., a), it may be defined for gas and/or liquid, for example, where the liquid may be oil or water. Where two-phase liquid-liquid flow exists (e.g., water and oil), then a may reflect the interfacial tension between oil and water (see, e.g., the slug flow regime and the bubble flow regime).

Figure 3:
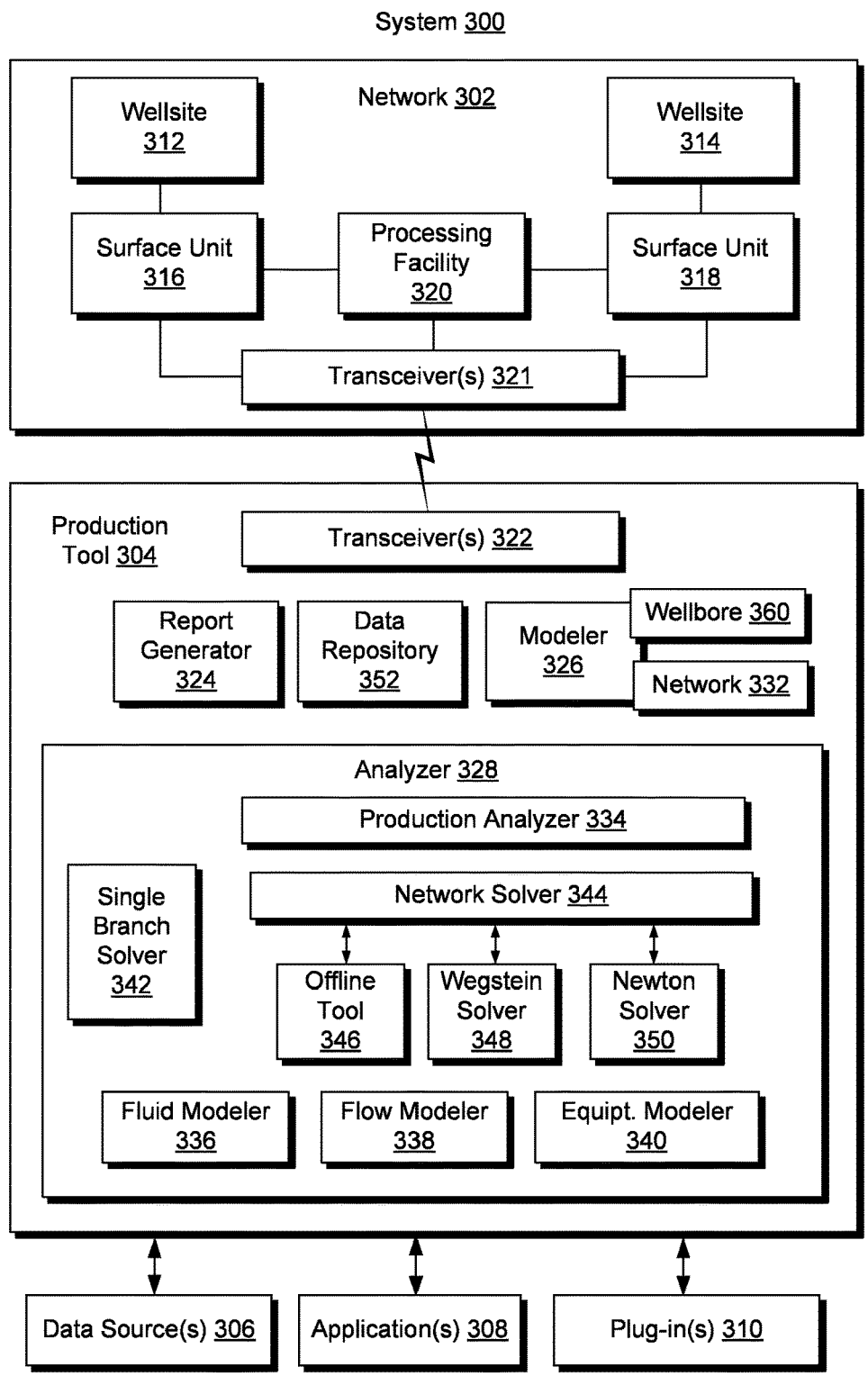
FIG. 3 illustrates an example of a system.

FIG. 3 shows an example of a schematic diagram of a production system 300 for performing oilfield production operations. As shown in the example of FIG. 3, the production system 300 can include an oilfield network 302, an oilfield production tool 304, one or more data sources 306, one or more oilfield application(s) 308, and one or more plug-in(s) 310. As an example, the oilfield network 302 can be an interconnection of pipes (e.g., conduits) that connects wellsites (e.g., a wellsite 1 312, a wellsite n 314, etc.) to a processing facility 320. A pipe in the oilfield network 302 may be connected to a processing facility (e.g., a processing facility 320), a wellsite (e.g., the wellsite 1 312, the wellsite n 314, etc.), and/or a junction in which pipes are connected. As an example, flow rate of fluid and/or gas into pipes may be adjustable; thus, certain pipes in the oilfield network 302 may be choked or closed so as to not allow fluid and/or gas through the pipe. A pipe may be considered open (e.g., optionally choked) when the pipe allows for flow of fluid and/or gas. As to a choke, choking may allow for adjusting one or more characteristics of a piece of flow equipment (e.g., a cross-sectional flow area, etc.), for example, for adjusting to fully open flow, for adjusting to choked flow and/or for adjusting to no flow (e.g., closed).

As an example, a choke may include an orifice that is used to control fluid flow rate or downstream system pressure. As an example, a choke may be provided in any of a variety of configurations (e.g., for fixed and/or adjustable modes of operation). As an example, an adjustable choke may enable fluid flow and pressure parameters to be changed to suit process or production requirements. As an example, a fixed choke may be configured for resistance to erosion under prolonged operation or production of abrasive fluids.

The oilfield network 302 may be a gathering network and/or an injection network. A gathering network may be an oilfield network used to obtain hydrocarbons from a wellsite (e.g., the wellsite 1 312, the wellsite n 314, etc.). In a gathering network, hydrocarbons may flow from the wellsites to the processing facility 320. An injection network may be an oilfield network used to inject the wellsites with injection substances, such as water, carbon dioxide, and other chemicals that may be injected into the wellsites. In an injection network, the flow of the injection substance may flow towards the wellsite (e.g., toward the wellsite 1 312, the wellsite n 314, etc.).

The oilfield network 302 may also include one or more surface units (e.g., a surface unit 1 316, a surface unit n 318, etc.), for example, a surface unit for each wellsite. Such surface units may include functionality to collect data from sensors (see, e.g., the surface unit 216 of FIG. 2). Such sensors may include sensors for measuring flow rate, water cut, gas lift rate, pressure, and/or other such variables related to measuring and monitoring hydrocarbon production. As shown, the oilfield network 302 can include one or more transceivers 321, for example, to receive information, to transmit information, to receive information and transmit information, etc. As an example, information may be received and/or transmitted via wire and/or wirelessly. As an example, information may be received and/or transmitted via a communications network such as, for example, the Internet, the Cloud, a cellular network, a satellite network, etc.

As an example, the oilfield production tool 304 may be connected to the oilfield network 302. The oilfield production tool 304 may be a simulator (e.g., a simulation framework) or a plug-in for a simulator (e.g., or other application(s)). The oilfield production tool 304 may include one or more transceivers 322, a report generator 324, an oilfield modeler 326, and an oilfield analyzer 328. As an example, the one or more transceivers 322 may be configured to receive information, to transmit information, to receive information and transmit information, etc. As an example, information may be received and/or transmitted via wire and/or wirelessly. As an example, information may be received and/or transmitted via a communications network such as, for example, the Internet, the Cloud, a cellular network, a satellite network, etc.

As an example, one or more of the one or more transceivers 322 may include functionality to collect oilfield data. The oilfield data may be data from sensors, historical data, or any other such data. One or more of the one or more transceivers 322 may also include functionality to interact with a user and display data such as a production result.

As an example, the report generator 324 can include functionality to produce graphical and textual reports. Such reports may show historical oilfield data, production models, production results, sensor data, aggregated oilfield data, or any other such type of data.

As an example, the data repository 352 may be a storage unit and/or device (e.g., a file system, database, collection of tables, or any other storage mechanism) for storing data, such as the production results, sensor data, aggregated oilfield data, or any other such type of data. As an example, the data repository 352 may include multiple different storage units and/or hardware devices. Such multiple different storage units and/or devices may or may not be of the same type or located at the same physical site. As an example, the data repository 352, or a portion thereof, may be secured via one or more security protocols, whether physical, algorithmic or a combination thereof (e.g., data encryption, secure device access, secure communication, etc.).

In the example of FIG. 3, the oilfield modeler 326 can include functionality to create a model of a wellbore and an oilfield network. As shown, the oilfield modeler 326 includes a wellbore modeler 360 and a network modeler 332. As an example, the wellbore modeler 360 can allow a user to create a graphical wellbore model or single branch model. As an example, a wellbore model can define operating parameters (e.g., actual, theoretical, etc.) of a wellbore (e.g., pressure, flow rate, etc.). As an example, a single branch model may define operating parameters of a single branch in an oilfield network.

As to the network modeler 332, it may allow a user to create a graphical network model that combines wellbore models and/or single branch models. As an example, the network modeler 328 and/or wellbore modeler 360 may model pipes in the oilfield network 302 as branches of the oilfield network 302 (e.g., optionally as one or more segments, optionally with one or more nodes, etc.). In such an example, each branch may be connected to a wellsite or a junction. A junction may be defined as a group of two or more pipes that intersect at a particular location (e.g., a junction may be a node or a type of node).

As an example, a modeled oilfield network may be formed as a combination of sub-networks. In such an example, a sub-network may be defined as a portion of an oilfield network. For example, a sub-network may be connected to the oilfield network 302 using at least one branch. Sub-networks may be a group of connected wellsites, branches, and junctions. As an example, sub-networks may be disjoint (e.g., branches and wellsites in one sub-network may not exist in another sub-network).

As an example, the oilfield analyzer 328 can include functionality to analyze the oilfield network 302 and generate a production result for the oilfield network 302. As shown in the example of FIG. 3, the oilfield analyzer 328 may include one or more of the following: a production analyzer 334, a fluid modeler 336, a flow modeler 338, an equipment modeler 340, a single branch solver 342, a network solver 344, a Wegstein solver 346, a Newton solver 350, and an offline tool 346.

As an example, the production analyzer 334 can include functionality to receive a workflow request and interact with the single branch solver 342 and/or the network solver 344 based on particular aspects of the workflow. For example, the workflow may include a nodal analysis to analyze a wellsite or junction of branches, pressure and temperature profile, model calibration, gas lift design, gas lift optimization, network analysis, and other such workflows.

As an example, the fluid modeler 336 can include functionality to calculate fluid properties (e.g., phases present, densities, viscosities, etc.) using one or more compositional and/or black-oil fluid models. The fluid modeler 336 may include functionality to model oil, gas, water, hydrate, wax, and asphaltene phases. As an example, the flow modeler 338 can include functionality to calculate pressure drop in pipes (e.g., pipes, tubing, etc.) using industry standard multiphase flow correlations. As an example, the equipment modeler 340 can include functionality to calculate pressure changes in equipment pieces (e.g., chokes, pumps, compressors, etc.). As an example, one or more substances may be introduced via a network for purposes of managing asphaltenes, waxes, etc. As an example, a modeler may include functionality to model interaction between one or more substances and fluid (e.g., including material present in the fluid).

As an example, the single branch solver 342 may include functionality to calculate the flow and pressure drop in a wellbore or a single flowline branch given various inputs.

As an example, the network solver 344 can includes functionality calculate a flow rate and pressure drop throughout the oilfield network 302. The network solver 344 may be configured to connect to the offline tool 346, the Wegstein solver 348, and the Newton solver 350. As an example, alternatively or additionally, one or more other solvers may be provided, for example, consider a sequential linear programming solver (SLP), a sequential quadratic programming solver (SQP), etc. As an example, a solver may be part of the production tool 304, part of the analyzer 328 of the production tool 304, part of a system to which the production tool 304 may be operatively coupled, etc.

As an example, the offline tool 346 may include a wells offline tool and a branches offline tool. A wells offline tool may include functionality to generate a production model using the single branch solver 342 for a wellsite or branch. A branches offline tool may include functionality to generate a production model for a sub-network using the production model for a wellsite, a single branch, or a sub-network of the sub-network.

As an example, a production model may be capable of providing a description of a wellsite with respect to various operational conditions. A production model may include one or more production functions that may be combined, for example, where each production function may be a function of variables related to the production of hydrocarbons. For example, a production function may be a function of flow rate and/or pressure. Further, a production function may account for environmental conditions related to a sub-network of the oilfield network 302, such as changes in elevation (e.g., for gravity head, pressure, etc.), diameters of pipes, combination of pipes, and changes in pressure resulting from joining pipes. A production model may provide estimates of flow rate for a wellsite or sub-network of an oilfield network.

As an example, one or more separate production functions may exist that can account for changes in one or more values of an operational condition. An operational condition may identify a property of hydrocarbons or injection substance. For example, an operational condition may include a watercut (WC), reservoir pressure, gas lift rate, etc. Other operational conditions, variables, environmental conditions may be considered.

As to the network solver 344, in the example of FIG. 3, it is shown as being connected to the Wegstein solver 348 and/or the Newton solver 350. The Wegstein solver 348 and the Newton solver 350 include functionality to combine a production model for several sub-networks to create a production result that may be used to plan an oilfield network, optimize flow rates of wellsites in an oilfield network, and/or identify and address faulty components within an oilfield network. The Wegstein solver 348 can use an iterative method with Wegstein acceleration.

An oilfield network may be solved by identifying pressure drop (e.g., pressure differential), for example, through use of momentum equations. As an example, an equation for pressure differential may account for factors such as fluid potential energy (e.g., hydrostatic pressure), friction (e.g., shear stress between conduit wall and fluid), and acceleration (e.g., change in fluid velocity). As an example, an equation may be expressed in terms of static reservoir pressure, a flowing bottom hole pressure and flowrate. As an example, equations may account for vertical, horizontal or angled arrangements of equipment. Various examples of equations may be found in a dynamic multiphase flow simulator such as the simulator of the OLGA™ simulation framework (Schlumberger Limited, Houston, Tex.), which may be implemented for design and diagnostic analysis of oil and gas production systems. As an example, a simulation framework may include one or more modules for building a model; for fluid and multiphase flow modeling; for reservoir, well and completion modeling; for field equipment modeling; and for operations (e.g., artificial lift, gas lift, wax prediction, nodal analysis, network analysis, field planning, multi-well analysis, etc.).

As an example, a system may implement equations that include dynamic conservation equations for momentum, mass and energy. As an example, pressure and momentum can be solved implicitly and simultaneously and, for example, conservation of mass and energy (e.g., temperature) may be solved in succeeding separate stages.

As an example, an equation for pressure differential can account for factors such as fluid potential energy (e.g., hydrostatic pressure), friction (e.g., shear stress between conduit wall and fluid), and acceleration (e.g., change in fluid velocity). In addition, as mentioned, equations can be used to take into account dynamic aspects. For example, equations can account for time and forces to accelerate and decelerate fluid (e.g., and objects) inserted into multiphase flow (e.g., consider pigs, etc.). As an example, an approach may consider the time it takes to conserve mass and energy (e.g., an amount of time it takes to drain a system, pipeline or vessel). As an example, an approach may consider ramp-up time for production, for example, from one production rate to another production rate, etc. As an example, an approach may consider time it takes before a first condensate appears at an outlet of a production network during startup, etc.

As an example, an equation for a pressure differential (e.g., $\Delta P$) may be rearranged to solve for flow rate (e.g., Q), where the equation may include the Reynolds number (e.g., Re, a dimensionless ratio of inertial to viscous forces), one or more friction factors (e.g., which may depend on flow regime), etc.

Through use of equations for flow into and out of a branch and equating to zero, a linear matrix in unknown pressures may be obtained. As an example, fixed flow branches (i.e., branches in which the flow does not change) may be solved directly for the node pressures.

As an example, a method can include defining variables and residual equations as well as branches in an oilfield network that may include a number of equipment items. As an example, a branch may be divided into sub-branches with each sub-branch containing a single equipment item. As an example, a new node may be used to join each pair of sub-branches. In this example, primary Newton-Raphson variables can include a flow ($Q_{ib}$) in each sub-branch in the network and a pressure $P_{in}$ at each node in the network. In this example, temperature (or enthalpy) and composition may be treated as secondary variables.

As an example, residual equations may include a branch residual, an internal node residual, and a boundary condition. In such an example, a branch residual for a sub-branch relates the branch flow to the pressure at the branch inlet node and the pressure at the outlet node. As an example, internal node residuals can define where total flow into a node is equal to total flow out of the node.

As an example, determining an initial solution may be performed using a production model where for each subsequent iteration, a Jacobian matrix is calculated. The values of the Jacobian matrix may be used to solve a Jacobian equation for the Newton-Raphson update. To solve the Jacobian equation, one or more types of matrix solvers may be used.

In the example of FIG. 3, the one or more data sources 306 include one or more types of repositories for data. For example, the one or more data sources 306 may be Internet sources, sources from a company having ties to the oilfield network 302, or any other location in which data may be obtained. The data may include historical data, data collected from other oilfield networks, data collected from the oilfield network being modeled, data describing environmental or operational conditions.

In the example of FIG. 3, the one or more oilfield applications 308 may be applications related to the production of hydrocarbons. The one or more oilfield applications 308 may include functionality to evaluate a formation, manage drilling operations, evaluate seismic data, evaluate workflows in the oilfield, perform simulations, or perform any other oilfield related function. In the example of FIG. 3, the one or more plug-ins 310 may allow integration with packages such as, for example, a TUFPP model, an Infochem Multiflash model (Infochem Computer Services Ltd., London, UK), an equipment model, etc. (e.g., consider one or more simulators like HYSYS™ (AspenTech, Burlington, Mass.), UNISIM™ (Honeywell, Morristown, N.J.), etc.).

While the example of FIG. 3 shows the oilfield production tool 304 as a separate component from the oilfield network 302, the oilfield production tool 304 may alternatively be part of the oilfield network 302. For example, the oilfield production tool 304 may be located at one of the wellsites (e.g., the wellsite 1 312, the wellsite n 314, etc.), at the processing facility 320, or any other location in the oilfield network 302. As another example, the oilfield production tool 304 may exist separate from the oilfield network 302, such as when the oilfield production tool 304 is used to plan the oilfield network.

Various types of numerical solution schemes may be characterized as being explicit or implicit. For example, when a direct computation of dependent variables can be made in terms of known quantities, a scheme may be characterized as explicit. Whereas, when dependent variables are defined by coupled sets of equations, and either a matrix or iterative technique is implemented to obtain a solution, a scheme may be characterized as implicit.

As an example, a scheme may be characterized as adaptive implicit ("AIM"). An AIM scheme may adapt, for example, based on one or more gradients as to one or more variables, properties, etc. of a model. For example, where a model of a subterranean environment includes a region where porosity varies rapidly with respect to one or more physical dimensions (e.g., x, y, or z), a solution for one or more variables in that region may be modeled using an implicit scheme while an overall solution for the model also includes an explicit scheme (e.g., for one or more other regions for the same one or more variables).

As an example, a scheme may be implemented as part of the ECLIPSE® 300 reservoir simulator marketed by Schlumberger Ltd. (Houston, Tex.). As an example, the aforementioned OLGA™ simulator may include an interface that allows for interoperability with an ECLIPSE® simulator. The ECLIPSE® 300 reservoir simulator may implement a fully implicit scheme or an implicit-explicit scheme that is implicit in pressure and explicit in saturation, known as IMPES. In the fully implicit scheme, values for both pressure and saturation are provided at the end of each simulation time-step; whereas, the IMPES scheme uses saturation values from the beginning of the time-step to solve for pressure values at the end of the time-step. In such examples, a reservoir simulator iterates until pressures values in grid blocks of a model of the reservoir being simulated have reached some internally consistent solution. However, a solution may be difficult to find if saturation (which the IMPES scheme assumes is constant within a time-step) changes rapidly during that time-step (e.g., a large percentage change in grid block values for saturation). The IMPES scheme may be able to cope with such an issue by decreasing "length" (e.g., duration) of the time-step but at the cost of more time-steps (e.g., in an effort to achieve a more stable solution).

The aforementioned fully implicit scheme may be a more stable option with saturation and pressure being obtained simultaneously so as any difference between their values for one time-step and a next time-step does not disturb a solution process as much as when compared to the IMPES scheme. Thus, in a fully implicit scheme, the "length" (e.g., duration) of a time-step may be larger but it also means that the fully implicit scheme may take additional processing time to achieve solutions (e.g., in comparison with an IMPES scheme). However, in a reservoir where properties change rapidly, a fully implicit scheme may provide a solution in less computational time than an IMPES scheme, even though an iteration of the fully implicit scheme may take longer to complete when compared to an iteration of the IMPES scheme.

The aforementioned ECLIPSE® 300 reservoir simulator may also implement one or more modules such as a black-oil simulator module, a compositional simulator module, or a thermal simulator module (e.g., for simulating thermodynamics, etc.). As an example, a black-oil simulator module may include equations to model three fluid phases (e.g., oil, water, and gas, with gas dissolving in oil and oil vaporizing in gas); as an example, a compositional simulator module may include equations to model phase behavior and compositional changes; and, as an example, a thermal simulator module may include instructions (e.g., for equations, etc.) to model a thermal recovery processes such as steam-assisted gravity drainage (SAGD), cyclic stream operations, in-situ combustion, heater, and cold heavy oil production with sand. As an example, one or more thermal modules may provide instructions for modeling and simulating multiple hydrocarbon components in both oil and gas phases, a single non-volatile component in an oil phase, oil, gas, water, and solids behaviors (e.g., optionally with chemical reactions), well production rates based on factors such as well temperature, low-temperature thermal scenarios (e.g., experiments or cold heavy oil production with sand), toe-to-heel air injection scenarios, foamy oil (e.g., as to effect on gas production, gas drive, oil production, etc.), multisegmented well models (e.g., optionally including dual-tubing, horizontal wells, multiphase flow effects in a wellbore, etc.).

As to network models, as an example, a method can include simulation of dynamic and/or steady state operation of an oil and gas production system over various ranges of operating conditions and configurations. In such an example, the method may include an implicit evaluation of conservation of energy equations in addition to mass and momentum as an effective technique for efficiently and robustly simulating the production system where, for example, the production system includes fluid such as heavy oil, steam or other fluids at or near critical pressures or temperatures. The term "critical point" is sometimes used herein to specifically denote a vapor-liquid critical point of a material, above which distinct liquid and gas phases do not exist.

As mentioned, a production system can provide for transportation of oil and gas fluids from well locations along flowlines which are interconnected at junctions to combine fluids from many wells for delivery to a processing facility. Along these flowlines (including at one or more ends of a flowline), production equipment may be inserted to modify the flowing characteristics like flow rate, pressure, composition and temperature. As an example, a boundary condition may depend on a type of equipment, operation of a piece of equipment, etc.

As an example, a simulation may be performed using one type of equipment along a flowline and another simulation may be performed using another type of equipment along the same flowline, for example, to determine which type of equipment may be selected for installation in a production system.

As an example, a simulation may be performed using one type of equipment at a position (e.g., with respect to a flowline) and another simulation may be performed using another type of equipment at a different position (e.g., with respect to the same flowline or a different flowline), for example, to determine which type of equipment may be selected for installation in a production system as well as to determine where a type of equipment may be installed. As an example, a simulation may be performed using one type of equipment at a position (e.g., with respect to a flowline) and another simulation may be performed using that type of equipment at a different position (e.g., with respect to the same flowline or a different flowline), for example, to determine where that type of equipment may be installed.

Figure 4:
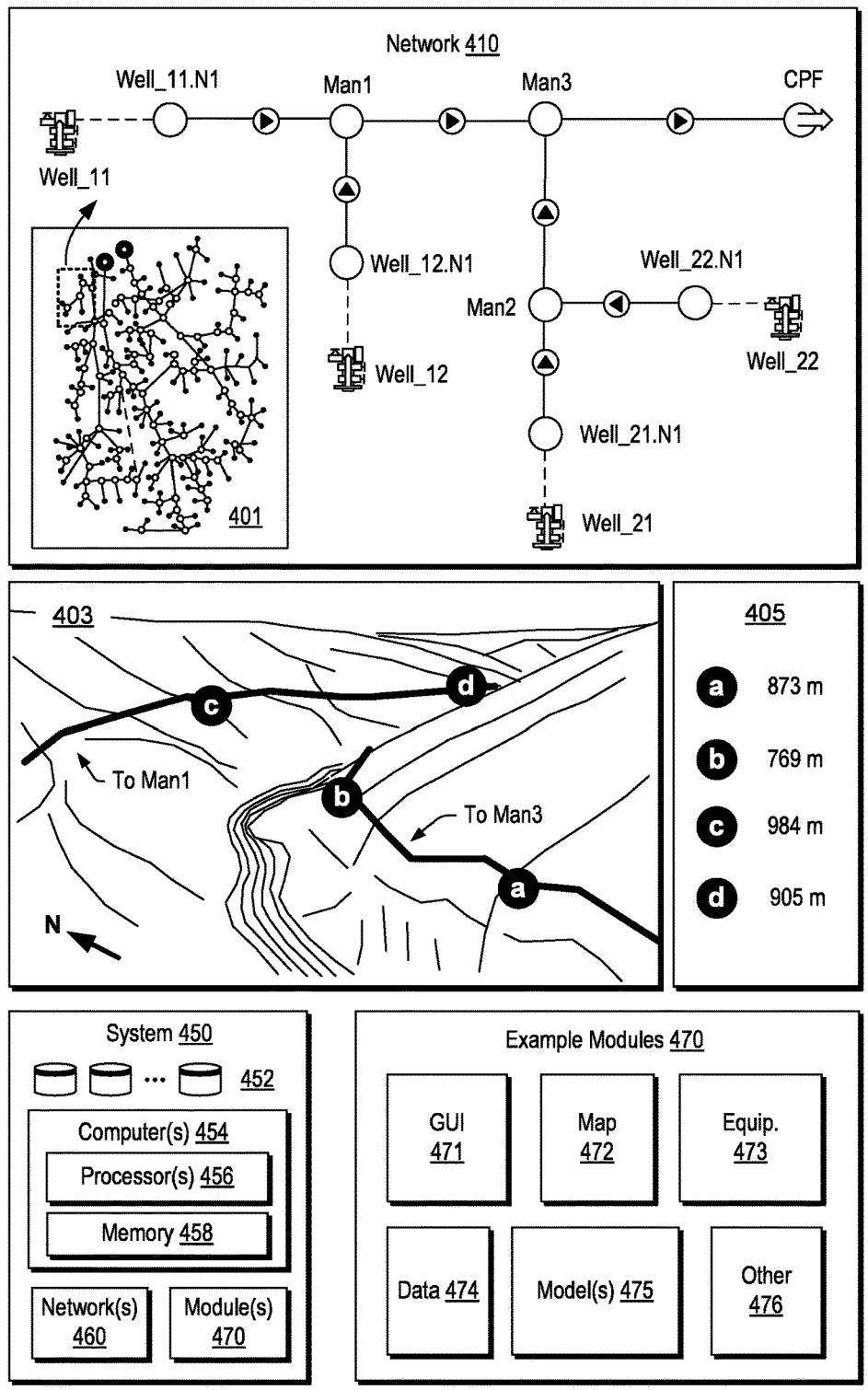
FIG. 4 illustrates an example of a network, an example of a system and examples of modules.

FIG. 4 shows an example of a relatively small production system network 410 (e.g., optionally a portion of a larger network 401), an example of a system 450 and examples of modules 470. As shown, the network 410 forms somewhat of a tree like structure where flowlines represent branches (e.g., segments) and junctions represent nodes. As shown in FIG. 4, the network 410 provides for transportation of oil and gas fluids from well locations along flowlines interconnected at junctions with final delivery at a central processing facility.

In the example of FIG. 4, various portions of the network 410 may include conduit. For example, consider a perspective view of a geologic environment 403 that includes two conduits which may be a conduit to Man1 and a conduit to Man3 in the network 410. The conduits may be specified at various points by characteristics, which may be characteristics of the environment, characteristics of the conduits, characteristics of fluid in the conduits, etc. For example, consider conduit elevation, which may allow for determination of conduit inclination. As an example, consider conduit cross-sectional flow area, which may be defined by one or more parameters such as, for example, a conduit diameter. As an example, consider fluid that may flow in a conduit where the fluid may be characterized at least in part by a property such as, for example, viscosity (see, e.g., the ternary diagram 250 and the table 260 of FIG. 2 and approaches to multiphase properties, etc.). As an example, thermal conditions may optionally be considered such as, for example, latent heat, heat transfer, etc. As an example, thermal conditions may depend on insulation of equipment, temperature of an environment, wind, sun, rain, snow, etc. Such factors may be considered when assessing an existing network, developing a network, extending a network, etc.

As an example, given information of operating condition(s) at boundary nodes (e.g., where fluid enters and exists the system) and the physical environment between them (e.g., geographical location, elevation, ambient temperature, etc.), a production engineer may aim to design a production system that meets business and regulatory requirements constrained to operating limits of available equipment.

As an example, a method can include implementing one or more modules to simulate steady state operation of a production system, for example, as including a network (e.g., as a sub-network, etc.) as in the example of FIG. 4

(also see, e.g., FIG. 1). Such a method may include simulating the steady state operation over a selected range of operating conditions and configurations (e.g., optionally a broadest reasonable range).

As explained, a production system may provide for transportation of oil and gas fluids from well locations to a processing facility and can represent a substantial investment in infrastructure with both economic and environmental impact. Simulation of such a system, which may include hundreds or thousands of flow lines and production equipment interconnected at junctions to form a network, can be complex and involve multiphase flow science and engineering and mathematical methods to provide solutions (e.g., by solving large systems of non-linear equations). Factors associated with solid formation, corrosion and erosion, and environmental impact may increase complexity and cost.

As an example, a method can include formulating a proxy (e.g., or surrogate) model that may be suitable for expediting network analysis. Such a method may, for example, be implemented via a computing system.

As shown in FIG. 4, the example system 450 includes one or more information storage devices 452, one or more computers 454, one or more networks 460 and one or more modules 470. As to the one or more computers 454, each computer may include one or more processors (e.g., or processing cores) 456 and memory 458 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 452. As an example, information that may be stored in one or more of the storage devices 452 may include information about equipment, location of equipment, orientation of equipment, fluid characteristics, etc.

As an example, the one or more modules 470 may include instructions (e.g., stored in memory) executable by one or more processors to instruct the system 450 to perform various actions. As an example, the system 450 may be configured such that the one or more modules 470 provide for establishing a framework, for example, that can perform network modeling. As an example, one or more methods, techniques, etc. may be performed using one or more modules, which may be, for example, one or more of the one or more modules 470 of FIG. 4.

FIG. 4 shows example modules 470 as including a graphical user interface (GUI) module 471, a map module 472, an equipment module 473, a data module 474 (e.g., for measured data, synthetic data, etc.), a modeling module 475, and one or more other modules 476.

As an example, one or more modules may include instructions to instruct a system to render terrain and equipment locations to a display (e.g., via the GUI module 471, the map module 472, the equipment module 473, etc.); receive data for at least a portion of a network (e.g., via the module 474); analyze the data with respect to a model associated with the terrain and the equipment locations (e.g., via the module 475); and render information to the display based at least in part on an analysis (e.g., via the GUI module 471, a report module, etc.).

As an example, a framework may be implemented using various features of a system such as, for example, the system 450 of FIG. 4. As an example, one or more modules may be provided that include instructions that may be executed by a processor or processors. As an example, instructions may be provided for execution of instructions in parallel, for example, to consider multiple features of a network or networks that may be associated with a geologic environment such as the geologic environment 110 of FIG. 1.

Production systems for oil and gas often cover multiple wells tied back to a manifold, platform or onshore, etc. (e.g., consider a sub-sea manifold, a wellhead platform, a land-based manifold, etc.). At a manifold or wellhead platform, production from different wells may be co-mingled (e.g., merged, mixed, etc.) and fed to one or more multiphase pipelines that can transport fluid, for example, to topside or central processing facilities. As an example, multiple manifolds and wellhead platforms may feed one topside/central processing facility. As an example, produced fluid from a topside/central processing facilities may again be fed to export pipelines for gas and/or oil to feed a market or a chemical processing plant.

Different teams may work on different parts of a production system, for example, as to different times throughout a lifecycle. In such an approach, one or more models may be created for the production system. As an example, a model can include different parts, which may be sub-models to be integrated into an overarching model. As an example, one or more models from an engineering phase may provide a suitable starting point for making an online surveillance and asset optimization system. In addition, smaller parts of a total model scope may be run to simulate and verify sub-tasks.

As an example, an approach to sub-modeling may deal with relatively large model scopes in a structured manner. For example, parts of a system may be run or a complete model scope may be simulated. As an example, sub-models may be implemented in a hierarchy.

As an example, simulations via sub-models may be performed in serial and/or in parallel, for example, using one or more computers. As an example, individual sub-models may run in a simulator engine. As an example, different simulator engines may communicate together using a data communication protocol and/or shared memory. Data for an overarching model (e.g., a model that includes two or more sub-models) may be communicated through a scheduler.

As an example, a scheduler may hold, retrieve, and distribute data from/to different sub-models engines. As an example, a scheduler may be responsible for controlling execution of one or more simulation tasks in each of a plurality of sub-models (e.g., consider pause, un-pause, control simulation speed, and making sure that the sub-models are aligned in time). As an example, a scheduler may distribute commands like save state, load state, delete state and set time to the different simulation engines.

As an example, a system that includes a scheduler may be implemented to perform a method that includes splitting up a model scope into sub-models and simulating the model (e.g., running the sub-models) in a coordinated manner. In such an example, the system may aim to achieve numerical stability. For example, a scheduler may be implemented that monitors numerical stability (e.g., without resorting to running sub-models on fixed, small time steps). As an example, a scheduler may provide for simulating an overarching model without integrating sub-models thereof in an explicit manner. For example, a scheduler may aim to integrate sub-models in an implicit manner.

As an example, a system may be implemented for integrating flow connection points between sub-models in an implicit manner. In such an example, the system can include a scheduler, which may provide for letting each of a plurality of sub-models to independently determine a time step (e.g., as to physical time as in numerical integration with respect to time). As an example, a scheduler may allow for one or more sub-model time steps to vary depending on dynamics of a system. As an example, data from a sub-model may be communicated back to a scheduler and may become available to one or more other sub-models when it reaches the scheduler.

As an example, one or more individual sub-models may be able to run at a certain maximum speed. As an example, maximum speeds may differ for different sub-models. As an example, a scheduler may control and monitor simulation progress, for example, to help ensure that one or more "faster" sub-models do not "run away" from one or more "slower" sub-models.

As an example, a scheduler may drive simulation by ticking a common reference clock. In such an example, updates on the scheduler reference clock may be given to individual sub-model external clocks (e.g., sub-model external clock items, etc.). As an example, respective individual sub-models may track respective external clocks.

As an example, an update rate on an external clock may be determined by one or more simulation speeds. In addition to the external clock, a scheduler may also provide a reference speed as input to one or more sub-models. As an example, sub-models may chase one or more updates on an external clock for performing simulation time steps. In such an example, when a sub-model catches up with the external clock it may stop. In an effort to avoid one or more fast sub-models from arriving at a latest given value on an external clock earlier than one or more slower sub-models, one or more sub-models may chase the external clock subject to a given reference speed. In such an approach, the reference speed may serve to slow one or more faster sub-models down to the simulation speed of the slowest sub-model.

As an example, at certain time intervals, a scheduler may coordinate execution and update a reference speed. Such intervals may vary, for example, depending on a preset simulation speed, achieved simulation speed, and a sub-model's internal time steps.

As an example, where sub-models run in parallel, data may be communicated from the sub-models to the scheduler when the sub-model finishes a time step. The data may be updated internally in a scheduler and may be available to the other sub-models. For example, some of the other sub-models may depend on the data from the first sub-model. The sub-models performing a time integration step may represent a minor time step in a scheduler.

As an example, data flow from/to one or more sub-models may be transferred according to the minor time steps. In such an example, a condition may be established such that data may be available at a "best possible" time resolution for a particular set up. To ensure that the data is taken into account at the proper time, data may be stamped with an appropriate marker such as a simulation time marker.

As an example, two values (e.g., current and previous) for each variable may be stored internally in a scheduler. For example, when data is used as input to one of the other sub-models, a scheduler may interpolate between a current and a previous value to a particular time. As an example, a scheduler may be programmed so that no sub-models run before particular dependent data is updated. As mentioned, a scheduler may control speed of sub-models so that one or more faster models are slowed down to a speed of a slowest sub-model. In such an example, the time to wait for data to be updated may be reduced.

As an example, a system may allow for a relatively large model to be split up into several smaller sub-models. In such an example, each of the sub-models may be simulated in different simulator engines. At least some model information and variables to make the simulation robust and numerically stable may be transferred and kept inside a scheduler. For example, consider a system where information is transferred to/from a scheduler/sub-models at a most frequent time resolution. Such a time resolution may be dependent on one or more model characteristics and may be determined, for example, by output from one or more sub-models. As an example, a system may provide for simulation to be performed at a speed close to the speed of the slowest sub-model. As an example, a method can include, by re-engineering/splitting up a portion of a model with an expected or proven slowest speed, increasing simulation speed of the model.

Figure 5:
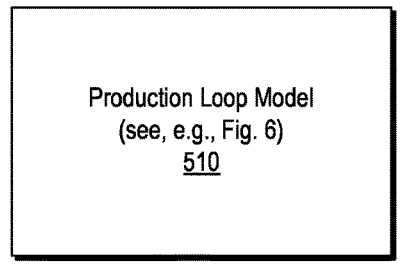
FIG. 5 illustrates an example of a model.
Figure 5:
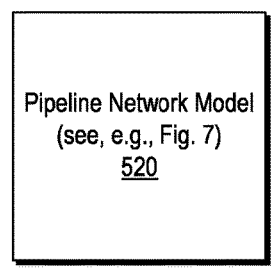
Figure 5:
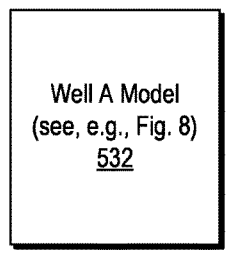
Figure 5:
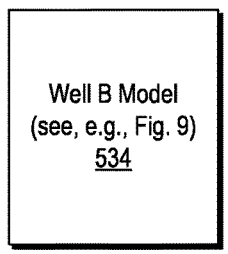
Figure 5:
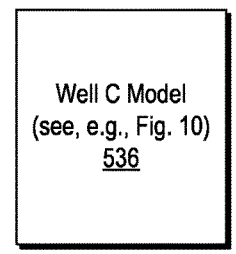
Figure 5:
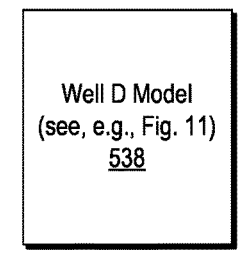

FIG. 5 shows a block diagram of an example of a production system 500 that includes a production loop model 510, a pipeline network model 520 and well models 532, 534, 536 and 538 for wells labeled A, B, C and D. FIGS. 6, 7, 8, 9, 10 and 11 show graphic illustrations of equipment associated with the models of FIG. 5.

As an example, a production system may operate dynamically with respect to a network model, for example, where information from the production system may be transmitted to a computing device, a computing system, etc., that performs model-based simulations. As an example, simulation results may provide a basis, directly and/or indirectly, for making one or more adjustments to a production system. For example, a position of a valve may be adjusted, a pump rate may be adjusted, a heater may be adjusted, separation equipment may be adjusted as to separating phases of a multiphase fluid, etc. As an example, transfer of information may be via wired and/or wireless channels. As an example, a data acquisition mechanism may operate automatically, semi-automatically and/or manually. As an example, a control mechanism may operate automatically, semi-automatically and/or manually. As an example, a model-based simulator may be operatively coupled to a data acquisition mechanism and/or a control mechanism that are operatively coupled to field equipment (e.g., equipment in a production system).

Figure 6:
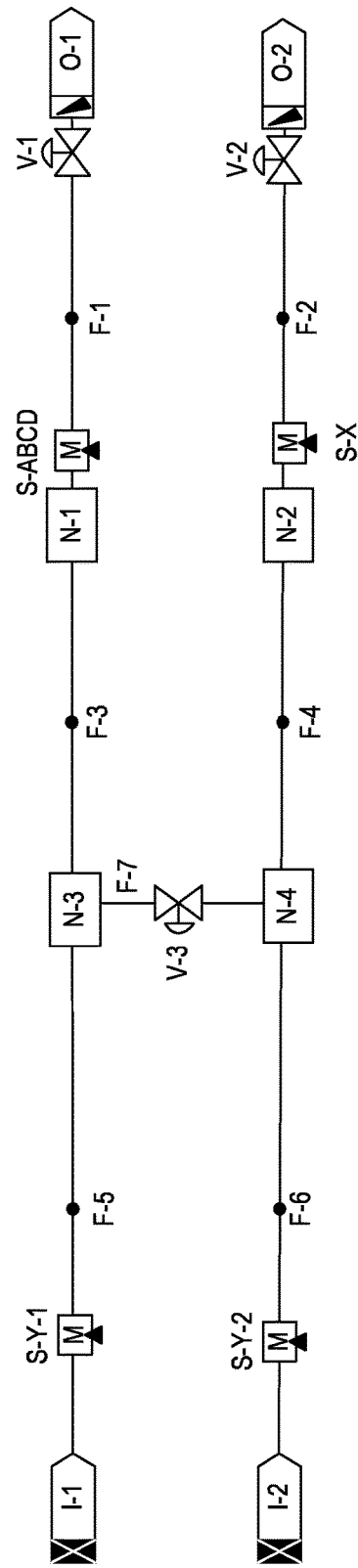
FIG. 6 illustrates an example of a production loop model.
Figure 7:
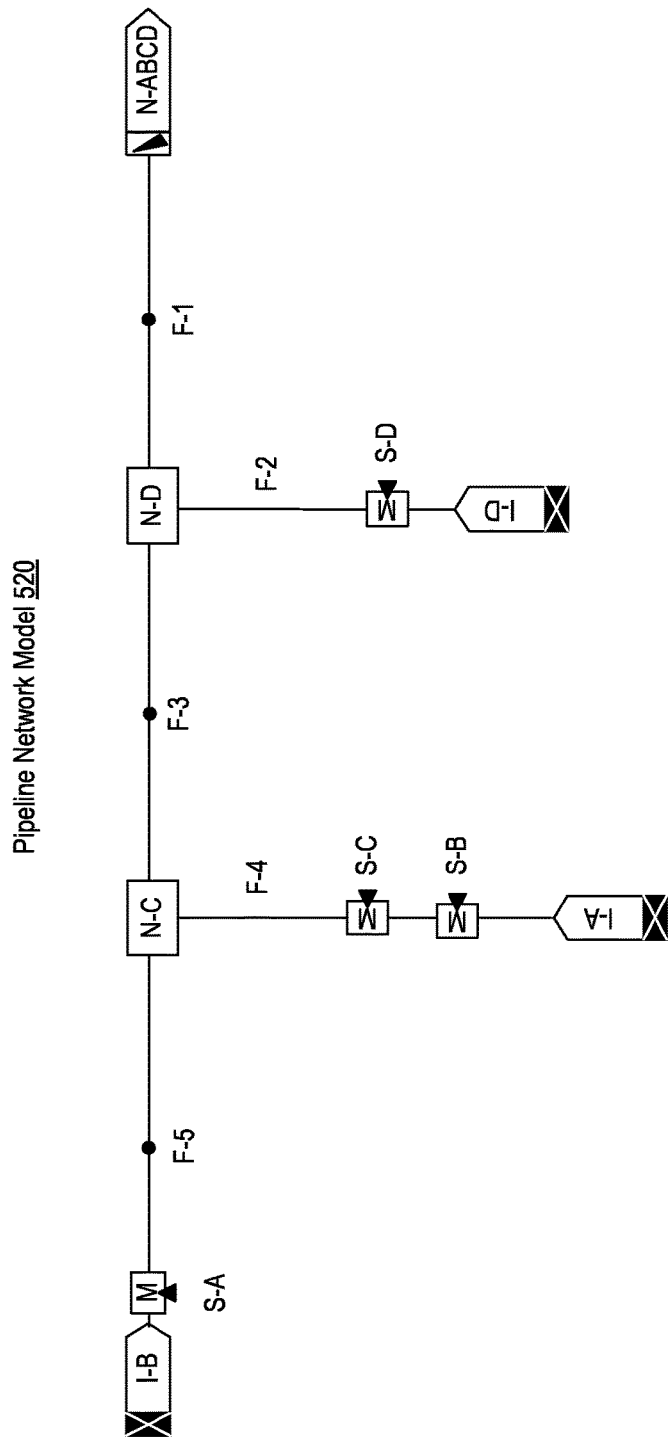
FIG. 7 illustrates an example of a pipeline network model.

FIG. 6 shows the production loop model 510, which includes six main flowlines labeled F-1 to F-6 and a cross-over F-7, which is relatively short in length. In the model 510, the main flowlines vary in length from about 0.5 km to about 45 km. Specifically, the lengths in this particular model are as follows: F-1 is about 45 km, F-2 is about 35 km, F-3 is about 6 km, F-4 is about 9.5 km, F-5 and F-6 are each about 0.5 km and F-7 is about 0.1 km. The flowlines shown in FIG. 7, are divided into straight segments called pipes where each pipe includes one or more sections.

As an example, section length can vary from about a few meters to about 100 m. Thus, for example, the number of sections in each flowline may vary from a few sections up to approximately 2000; noting that the total number of sections can be larger than 2000.

As an example, a main production loop and associated pipelines that follow a seabed or a surface in the Earth may run on a time step of between about 1 second and about 20 seconds. For example, the model 510 may runs multiple time steps where the time step is varying between in a range from about 8 seconds to about 10 seconds.

As an example, a production system can include vertical pipelines, wells (e.g., each including a vertical part) and risers (e.g., each including a vertical part), etc. In such an example, "vertical" conduits may runs on a relatively smaller time step, for example, about 1 second.

In the example of FIG. 6, the model 510 for the production loop includes interface points to other models. For example, the model 510 includes two outlet interface points (e.g., FLOWOUT) labeled as O-1 and O-2. Such portions of a production loop model may be interfaced to a topside model with receiving facilities, for example, consider equipment such as inlet separators, second and third stage separators, compressors, valves and control logic. As an example, a topside model may run on time step of around 1 second.

In the example of FIG. 6, the model 510 also includes four inlet interface points (e.g., FLOWIN) to other sub-models: (i) S-ABCD interface point for the pipeline ABCD model; (ii) S-X interface point for a sub-sea template X where the sub-sea template X includes an outlet interface where wells connected to X are interconnected to S-X in a single point through the template X model; (iii) S-Y-1 and (iv) S-Y-2 interface points for template Y.

FIG. 7 shows the pipeline network model 520, for example, as an ABCD pipeline model as associated with wells A, B, C and D. In the example of FIG. 7, the pipeline network model 520 includes five main flowlines, labeled F-1 to F-5. As shown, the main flowlines F-3 and F-5 are of lengths of about 30 km and about 8 km, respectively while the other ones are relatively short. As shown, the example pipeline network model 520 includes five pipelines and six nodes.

As an example, section lengths may vary from about a few meters to about 100 m. As an example, a number of sections in each flowline may vary from about a few sections up to approximately 2000; noting that a total number of sections can be larger than 2000. As an example, production loop and pipelines that follow a seabed or a landscape may run on a time step between about 1 second and about 20 seconds. As an example, the model 520 may runs on a time step in a range between about 6 seconds to about 18 seconds. As mentioned, vertical portions (e.g., substantially vertical, as may be measured with respect to a horizon of the Earth), may run on a smaller time step or steps, for example, about 1 second.

The model 520 of FIG. 7 includes interface points to other models. For example, one outlet interface point (e.g., FLOWOUT) labelled N-ABCD is connected to the S-ABCD interface point in the production loop model 510 while four inlet interface points (FLOWIN) to other sub-models include: (i) S-A interface point for the well A model; (ii) S-B interface point for the well B model; (iii) S-C interface point for the well C model; and (iv) S-D interface point for the well D model.

Figure 8:
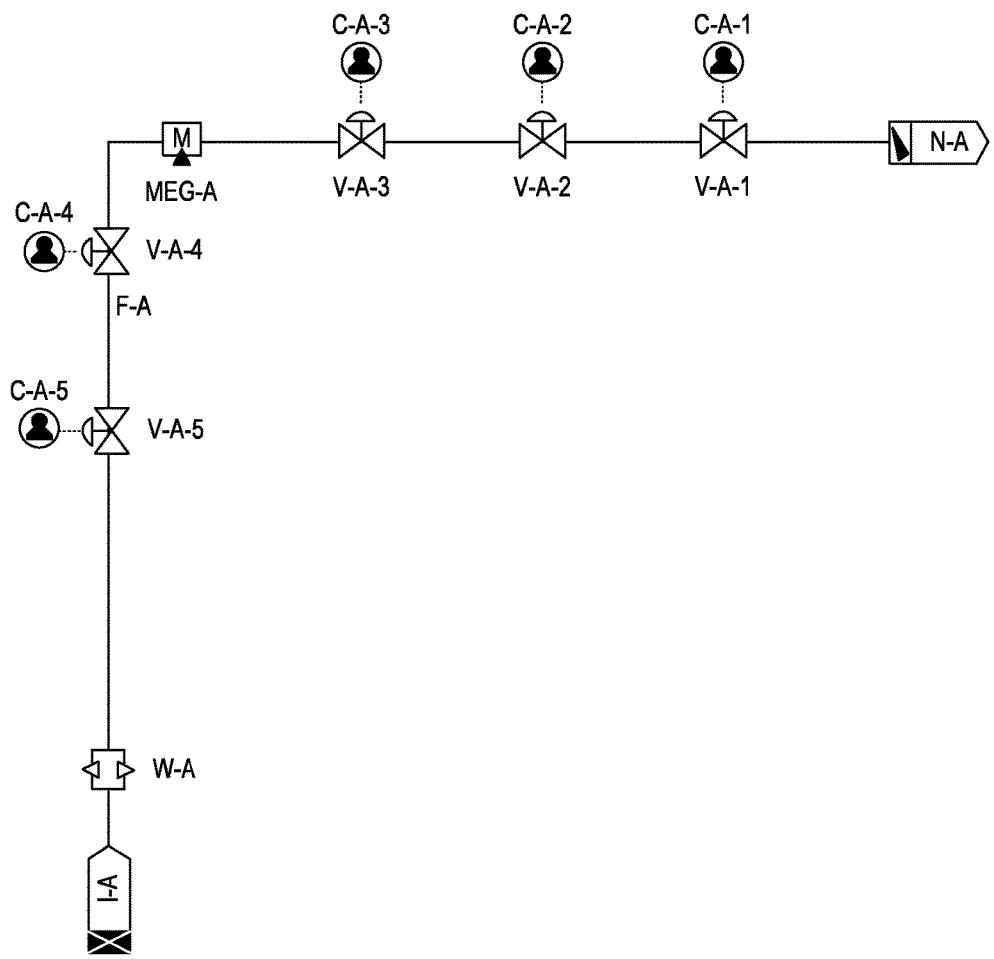
FIG. 8 illustrates an example of a well model.
Figure 9:
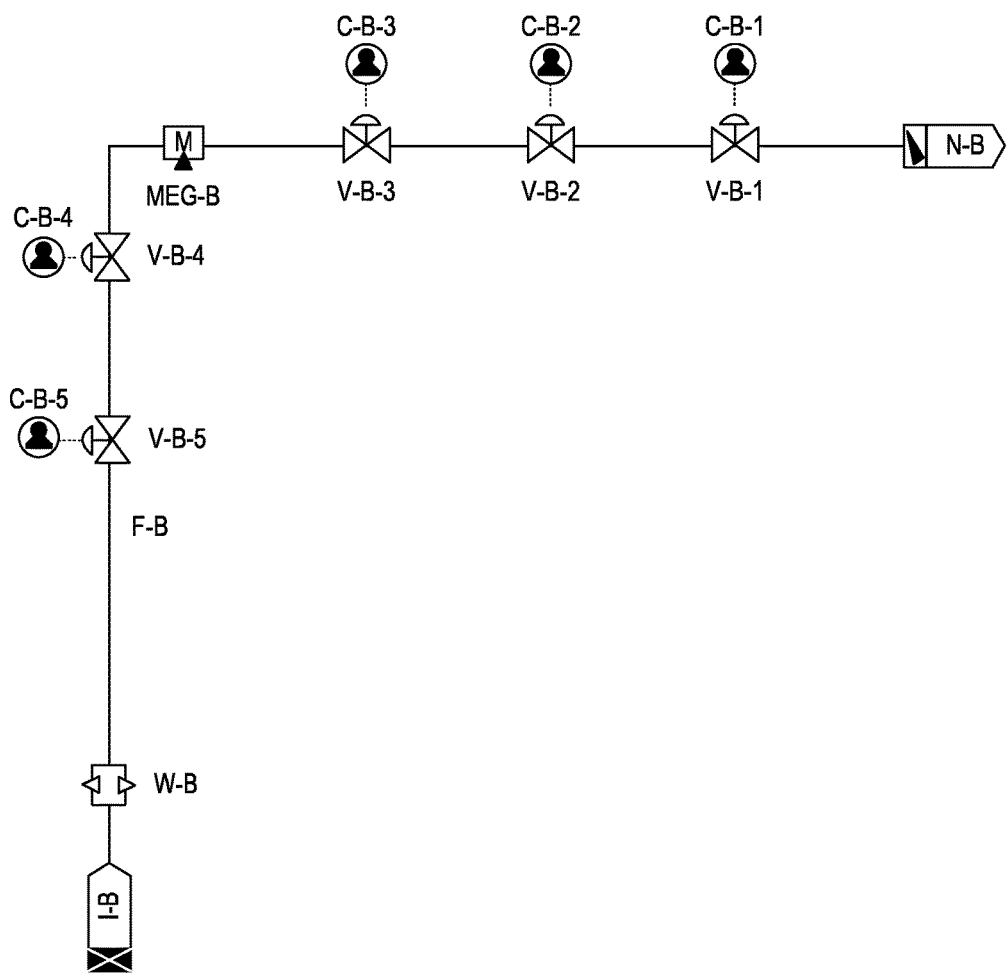
FIG. 9 illustrates an example of a well model.
Figure 10:
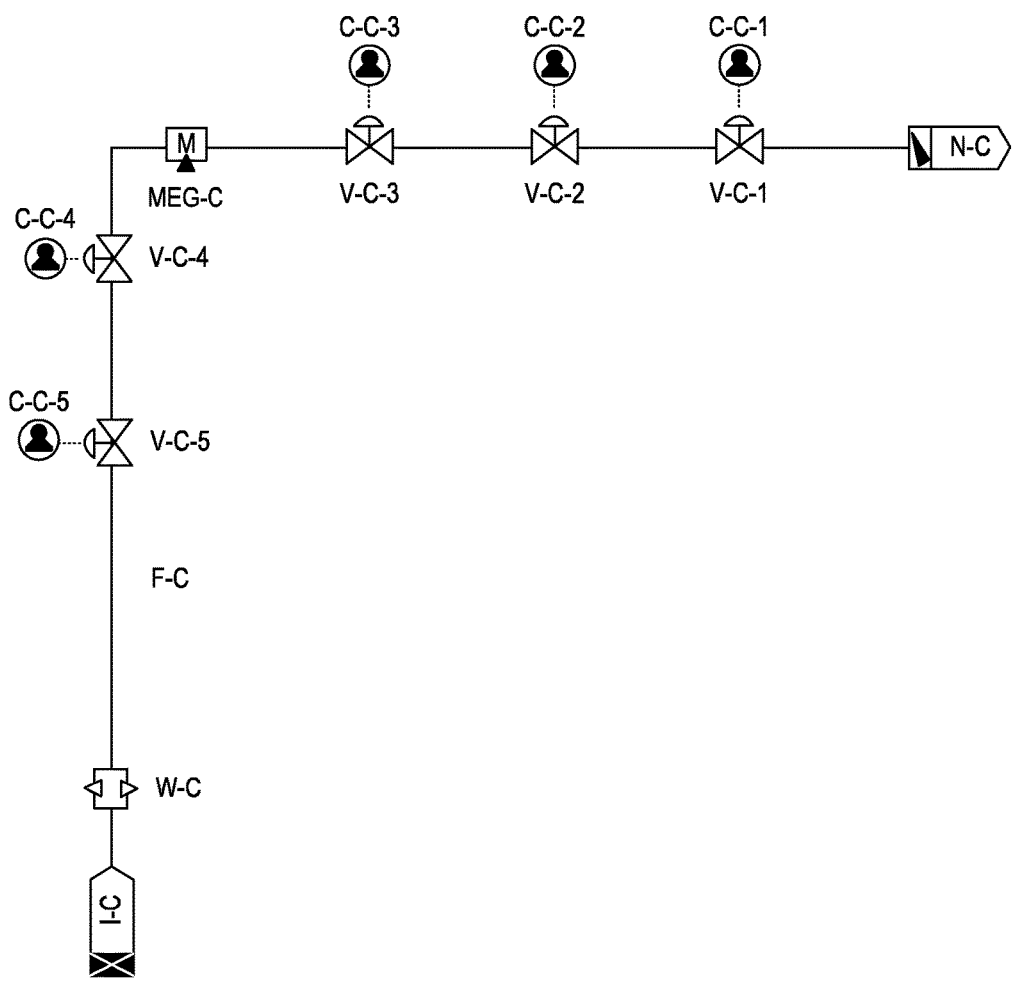
FIG. 10 illustrates an example of a well model.
Figure 11:
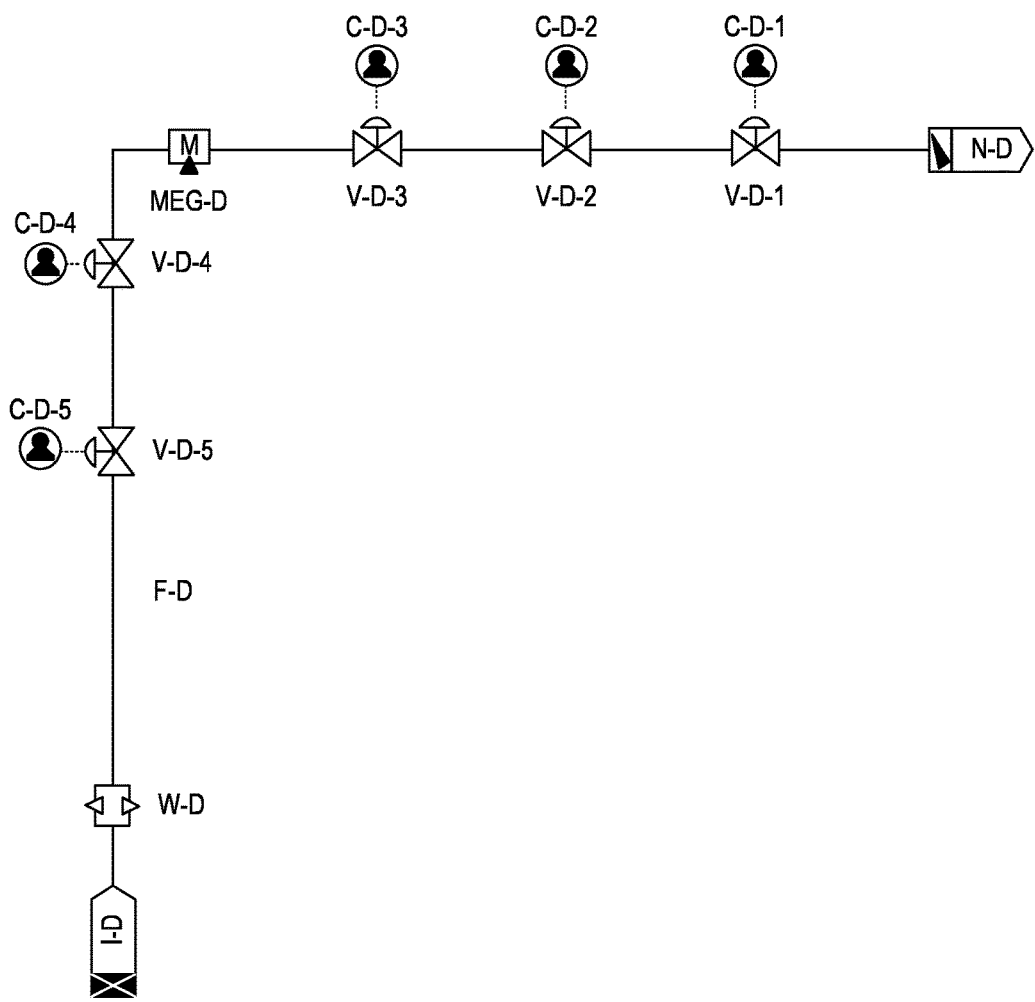
FIG. 11 illustrates an example of a well model.

FIG. 8 shows the well A model 532; noting that in the example of FIG. 5, the well models may be the same such that the description of the well A model 532 may be used to understand the well B model 534 of FIG. 9, the well C model 536 of FIG. 10 and the well D model 538 of FIG. 11.

The model of well A 532 describes the flow path from reservoir conditions I-A to wellhead N-A. At the wellhead there are three valves: (i) Production Master Valve V-A-3, (ii) Production Wing Valve V-A-2; and (iii) Production Choke Valve V-A-1.

As an example, pressure/temperature transmitters can be included at various locations such as, for example, between valves, downstream of valves and/or upstream of valves. As an example, one or more flow transmitters may be located at or near a wellhead (see, e.g., FIG. 2).

In the example of FIG. 8, the model 532 also includes upper and lower sub-surface valves (V-A-4 and V-A-5), and reservoir production zone W-A. Further shown is a MEG injection point MEG-A and manual controllers C-A-1 to C-A-5, for example, to operate the valves V-A-1 to V-A-5.

As an example, a model of a well can include equations that account for heat transfer, for example, from flowing production fluid to surroundings along a wellbore. As an example, a time step of a well model may vary. As an example, for a given production rate, a time step of a well model may be about 1 second.

Figure 12:
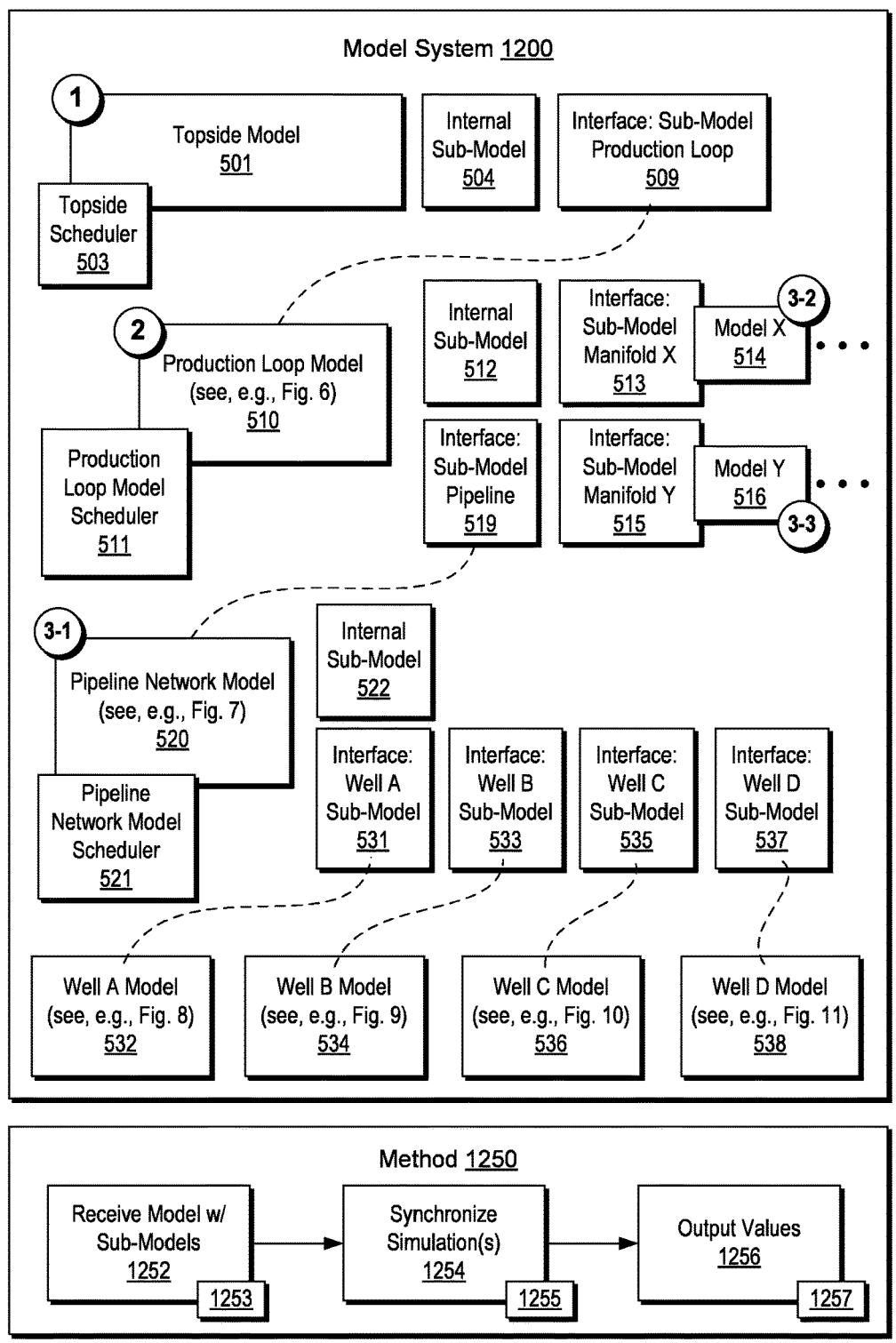
FIG. 12 illustrates an example of a system and an example of a method.

FIG. 12 shows an example of a model system 1200 and an example of a method 1250. In the example model system 1200, levels may be defined as Level 1, Level 2, Level 3-1, Level 3-2 and Level 3-3 (see, e.g., labels in circles).

As to Level 1, in the example model system 1200, it includes a topside model 501 with a scheduler 503, an internal sub-model 504 for processing facilities and a sub-model interface 509 for the production loop model 510. As to Level 2, in the example model system 1200, it includes the production loop model 510, a scheduler 511, an internal sub-model 512 for the production loop, a sub-model interface 513 for a sub-model manifold X 514, a sub-model interface 515 for a sub-model manifold Y 516, and a sub-model interface for the pipeline network model 520. As to Level 3, in the example model system 1200, it includes Level 3-1, which includes the pipeline network model 520, a scheduler 521, an internal sub-model 522 for pipelines, and sub-model interfaces 531, 533, 535 and 537 for the well A model 532, the well B model 534, the well C model 536 and the well D model 538. As to Level 3-2, it includes the manifold model X 514, a scheduler, an internal sub-model for manifold piping and sub-model interfaces for well X1 to well X4. As to Level 3-3, it includes the manifold model Y 516, a scheduler, an internal sub-model for manifold piping and sub-model interfaces for well Y1 to well Y4.

As an example, the scheduler 511 may handle the production loop model 510 as including four sub-models. In such an example, consider one internal sub-model 512 simulating the production loop of FIG. 6 and external sub-models simulating the pipeline network model 520 (e.g., Pipeline ABCD), the template manifold X 514 and the template manifold Y 516. Again, flow interface points (e.g., S-ABCD, S-X, S-Y-1 and S-Y-2) to external models are depicted in FIG. 6.

As an example, the scheduler 521 may handle the pipeline network model 520 as including five sub-models. For example, consider one internal sub-model 522 simulating the pipelines shown in FIG. 7 and four external sub-models simulating the well A, B, C and D models 532, 534, 536 and 538 as shown in FIGS. 8, 9, 10 and 11, respectively. In FIG. 7, flow interface points to the external models (S-A, S-B, S-C and S-D) are depicted.

As an example, in the model system 1200 of FIG. 12, the scheduler 511 can operate without knowledge as to whether the pipeline network model 520 (e.g., Pipeline-ABCD) is handled by a scheduler or not. The model system 1200 is an example of how multi-level hierarchical sub-modeling may be handled (e.g., structured, implemented, etc.). As an example, an individual model may be run in a stand-alone mode or, for example, as a "slave/server" mode, for example, with respect to a model on a higher level (e.g., consider "slave/master", "client/server", etc., as modes of operation in a hierarchical model architecture).

As an example, a model system may include characteristic time steps. For example, sub-models can include different dynamics, thus the time steps of the different parts of the dynamic models may differ and/or change. As an example, one or more time steps of an individual model may change depending on operational conditions. As an example, sub-modeling and scheduling can be utilized to simulate different parts of an overarching model where the different parts may implement their own characteristic time step(s). Such an approach may allow for simulation of a model of a system more rapidly and/or with fewer computational/memory resources when compared to simulation of an overarching scope via a single model (e.g., in an explicit approach). As an example, sub-modeling may provide for running across multiple computers and on clusters. For example, at least one sub-model may be run on computing equipment that differs from at least one other sub-model.

As an example, a system can include a scheduler module that can synchronize several interface modules so that large multiphase flow models can be split up into sub-models where such sub-models may optionally run at least in part in a parallel manner. For example, a sub-model may run via a separate executable file. As an example, a scheduler module may be suitable for execution in a simulator framework, for example, where a scheduler may be instantiated along with sub-models by the simulator framework to perform synchronized simulation of an overarching model (e.g., an optionally to output information, signals, commands, etc. for purposes of control of one or more pieces of equipment of a production network).

As mentioned, a synchronized simulation approach that includes a scheduler and sub-models may provide for an increase in computation speed. For example, a speed increase may stem from an ability to run a model faster if it can be split into sub-models in such a way that a time step of the models differs with a factor greater than two.

In FIG. 12, the method 1250 includes a reception block 1252 for receiving a model of a fluid production network where the model includes a plurality of sub-models; a synchronization block 1254 for synchronizing simulation of the plurality of sub-models with respect to time; and an output block 1256 for outputting values for fluid flow variables of the model. As an example, values output may be utilized in one or more field operations. For example, consider controlling one piece of equipment based at least in part on such values. As an example, a method such as the method 1250 can include receiving information from one or more sensors of a production network. For example, consider one or more of the sensors of the example system of FIG. 2.

The method 1250 is shown in FIG. 12 in association with various computer-readable media (CRM) blocks 1253, 1255 and 1257 (e.g., modules). Such blocks generally include instructions suitable for execution by one or more processors (or processing cores) to instruct a computing device or system to perform one or more actions. While various blocks are shown, a single medium may be configured with instructions to allow for, at least in part, performance of various actions of the method 1250. As an example, a computer-readable medium (CRM) may be a computer-readable storage medium that is not a carrier wave, for example, such as the memory device 174 of the computing device or system 170 of FIG. 1, where the memory device 174 includes memory.

Figure 13:
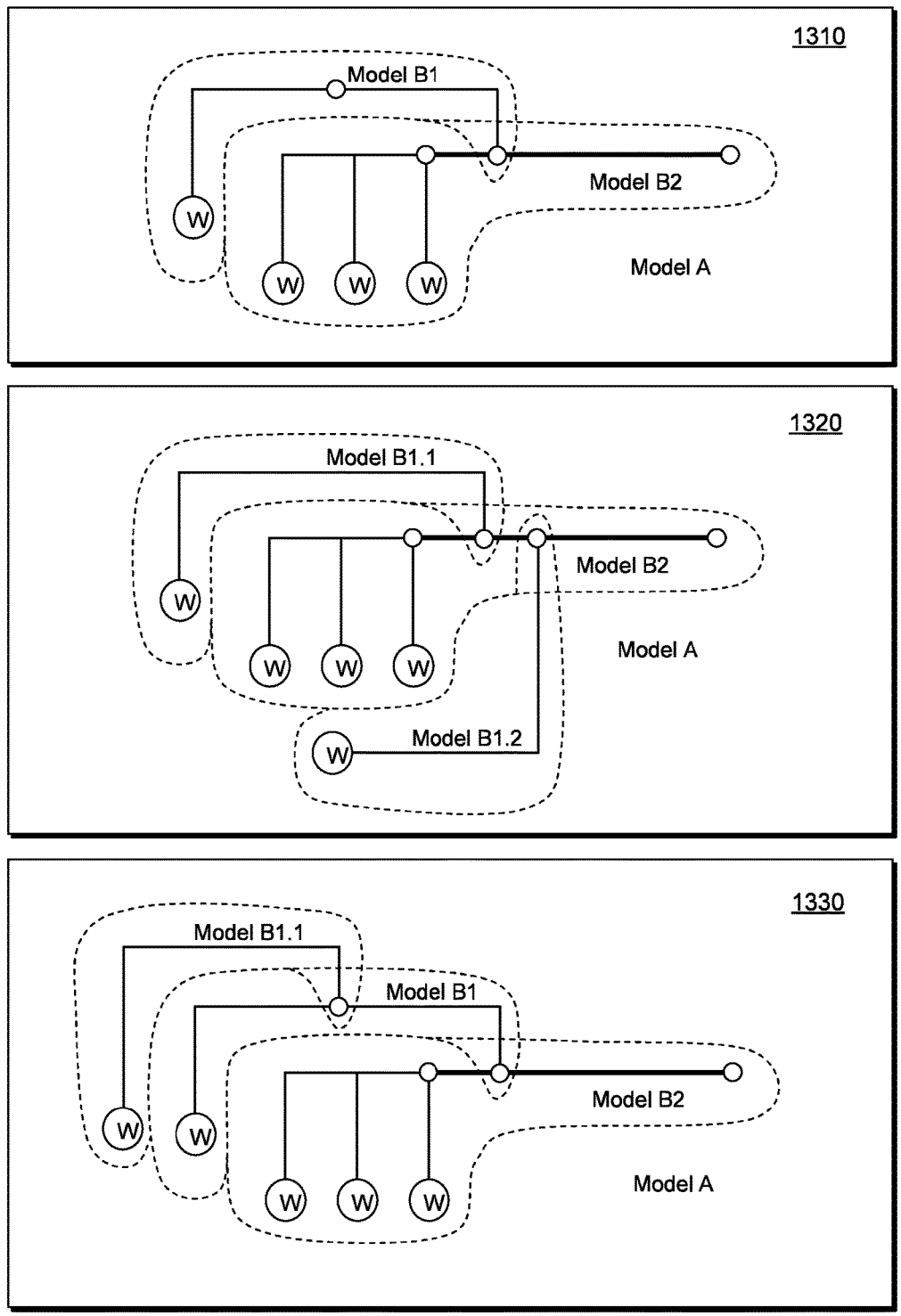
FIG. 13 illustrates examples of models.

FIG. 13 shows examples of models 1310, 1320 and 1330 that are split. For example, consider a model A split into models B1 and B2. In such an example, a split may aim to isolate a particular section or part of the model A that is limiting the time step (e.g., due to some condition on section lengths, etc.). In such an example, placing that smaller part of the model into model B1 and the main model into model B2 can help to increase the speed where the model B2 can be run on a time step several times greater than the time step of model B1.

As an example, the models B1 and B2 can be interfaced in terms of one or more variables. For example, consider interfacing of mass, energy and momentum flowing out of model B1 into model B2 and vice versa in the case of back flow from model B2 to model B1. In such an example, results available in variables calculated in models B1 and B2 can be communicated between the two models.

As an example, consider interconnection of mass flows between models B1 and B2. Assume that the flow from model B1 is positive from model B1 into model B2. For model B1 to calculate the mass flows from model B1 into model B1, the pressure in the section where model B1 is interfaced into model B2 can be an input to model B1. Further, the mass flows of gas, oil and water calculated by model B1 can be input to model B2.

As an example, a scheduler module can include interface modules that may be configurable, for example, to configure model dependencies. In such an example, for an interface module, one or more inputs may be added and a scheduler may provide time interpolation of inputs to a simulator namespace.

As an example, one or more industrial information technology platforms that may include Open Platform Communications Data Access (OPC DA) functionality, which can be used to connect to one or more sensors and/or pieces of equipment, for example, through Classic OPC and/or OPC Unified Architecture (UA) as well as one or more standards such as, for example, MODBUS®, WITSML, etc. As an example, connections, whether wired and/or wireless, may provide for data acquisition and/or control, where such connections may be operatively coupled to a simulation system.

As an example, a method can include adding interface modules to a scheduler. For example, a scheduler module can be associated with one or more interface modules to control a simulation of a model. As an example, inclusion of interface modules can be accomplished through a new/add item in a popup menu of a graphical user interface (GUI) of a scheduler as rendered to a display or, for example, through properties of a scheduler. In such an example, when selecting the new/add item a list of available interface modules may be rendered to a display.

As an example, a model might depend on another model (e.g., one-sided) or models might depend mutually on one another. For example, models B1 and B2 may be mutually dependent (B1↔B2) in variables mass flows and pressure. In such an example, a system may regard model B2 as above model B1 due to default inherent flow direction in the process network from model B1 into B2.

As an example, where mass flows from B1 into B2, interconnection of mass flows between models B1 and B2 may not depend on pressure at an interface point in model B2. In such an example, the reason may be due to flow from model B1 into B2. For example, the model B2 depends on model B1 but model B1 does not depend on model B2. In such an example, the dependence is one sided (B2→B1). For example, consider a gas lifted well or riser where gas injection rate is designed to meet particular conditions.

In FIG. 13, the model 1320 shows that the model B2 depends on both model B1.1 and B1.2, (B2↔B1.1 and B2↔B1.2), but the two models B1.1 and B1.2 do not depend on each other. For example, a scheme may consider whenever B1 is ahead of B1.1 and B1.2 in time, model B1.1 and B1.2 can be run simultaneously to get ahead of B1. Next B1.1 and B.1.2 is to be paused until B2 is ahead of either B1.1 or B1.2. In such an example, a rule can be: run the model(s) that is(are) lagging in time.

In FIG. 13, the model 1330 shows that the model B2 depends on model B1 and indirectly on model B1.1. For example, mutually dependences are B2↔B1 and B1↔B1.1, that is, model B2 depends on model B1 which again depends on model B1.1 (B2↔B1↔B1.1). In such an example, model B2 can run whenever B1 is ahead of B2 and model B1 can run whenever B1.1 is ahead of B2. This means that model B2 can run whenever both model B1.1 and B2 are ahead of B1, etc. In such an example, a rule can be: run the model that is lagging in time.

As an example, a representation of an interface module in a scheduler can include a list of modules that the present module depends on. For example, consider implementation as an array of pointer to interface modules. As an example, a scheduler may include a list (e.g., an array of pointers) to included simulation modules in a scheduler and a list (e.g., an array of pointers) to independent modules.

As an example, prior to dependencies being configured, a list of independent modules may be the same as a list of included models. In such an example, whenever a new module is included, it can be added to the list of available modules and to a list of independent modules. As an example, configuration of model dependencies may commence with independent models that include sub-models where fluid flows from the sub-models into the main model(s). As an example, sub-models may be configured as dependent on the main model(s), for example, by removing a sub-module in a list of independent modules and including in a list of dependent modules in a main module. If a sub-model and a main model are mutually dependent, a reference (pointer) to the main module can be included in a list of dependent modules of the sub-modules. Whereas, if a sub-model is not dependent on a main model, it may not be included in a sub-models list of dependent models. As an example, a process may be repeated for sub-modules; noting that a main module may not be a sub-module in a sub-module or another main module (e.g., not a main module).

As an example, a configuration process may generate a list of independent modules that includes the main module(s). In such an example, sub-modules (e.g., interface modules to models where the flow out of a model enters into another model) can be located in a list of dependent models.

Figure 14:
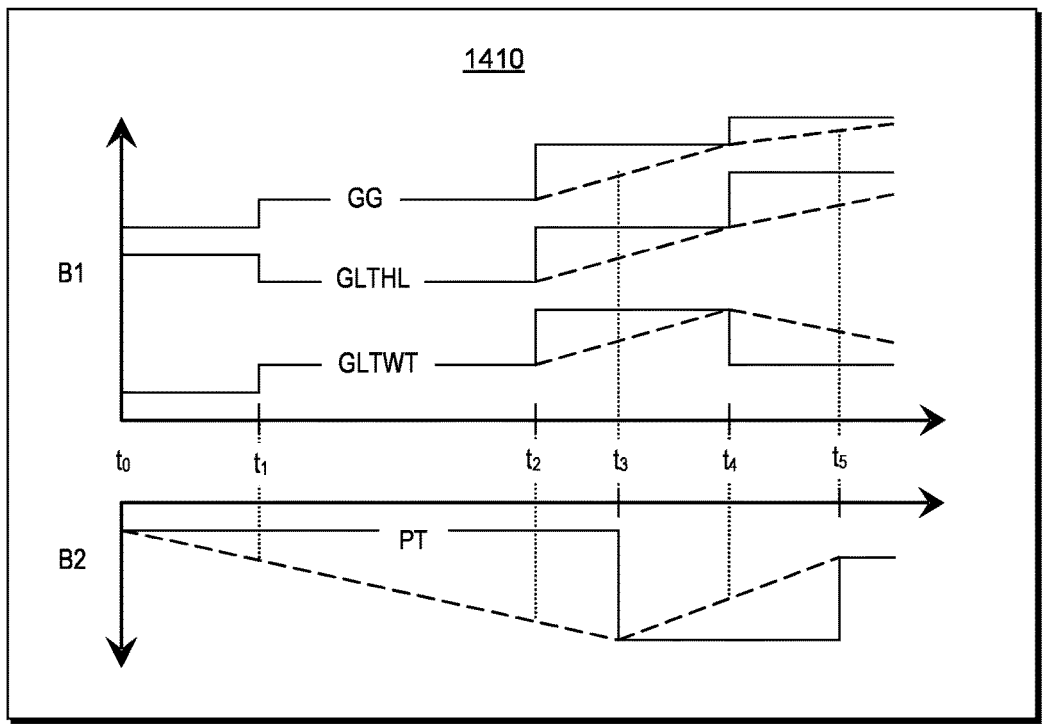
FIG. 14 illustrates an example of a time chart.
Figure 14:
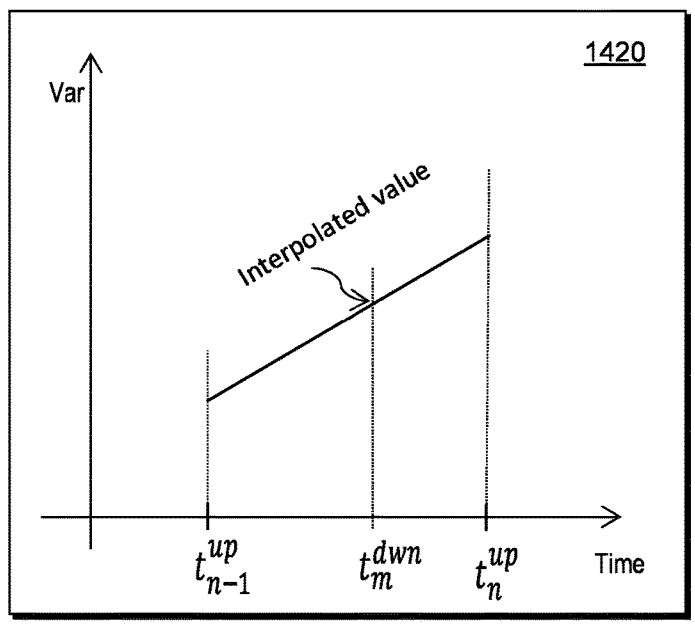

FIG. 14 shows an example of a time chart 1410 for interpolation of data where data in model B1 is interpolated at time points of model B2 and data in model B2 is interpolated at time points in model B1. FIG. 14 also shows an example of a plot 1420 of an interpolation technique where an interpolated value for a time is based at least in part on values at two other times.

In the example time chart 1410 of FIG. 14, interconnection of mass flows between models B1 and B2 and time interpolation of data are shown. Assume that the flow from models B1 and models B2 is synchronized at time to, assume that model B2 takes one TIME step HT=7.2 seconds to TIME $t_{B2}=t_0+7.2$. Further, assume that model B1 takes one time step HT=2 seconds to TIME $t_{B1}=t_0+2$. In such an example, model B1 can make this time step based on pressure input from model B2 at time $t_0$. Then since model B1 is lagging in time the scheduler can trigger yet another time step in model B1. As an example, assume that the time step of model at TIME $t_{B1}=t_0+2$ is HT=4 seconds. In such an example, pressure input to model B1 can be set to the interpolated value at time $t_{B1}=t_0+2$. The pressure can be interpolated in time to the current time of model B1 since the pressure is available at time points $t_0$ and $t_0+7.2$.

As an example, a scheduler can record and store internally the latest two values of inputs. For the module(s) leading in time, a scheduler can provide time interpolated values of these inputs to a simulation namespace for the module(s) leading in time. The interpolation time may be taken as the current time of an interface module to which the input is provided. For the modules lagging in time the output from the scheduler can be equal to the input.

As an example, there may be a zero order interconnection of mass flows between models B1 and B2 as to time interpolation of data. For example, input to model B1 can be a calculated pressure of model B2. In such an example, whenever model B2 is leading in time, the time of model B1 can be between the previous time and the current time of model B2. Thus, interpolating between these two time points can be performed. The interpolation time can be the time of model B1, particularly the time of the module to which the data is interconnected.

Figure 15:
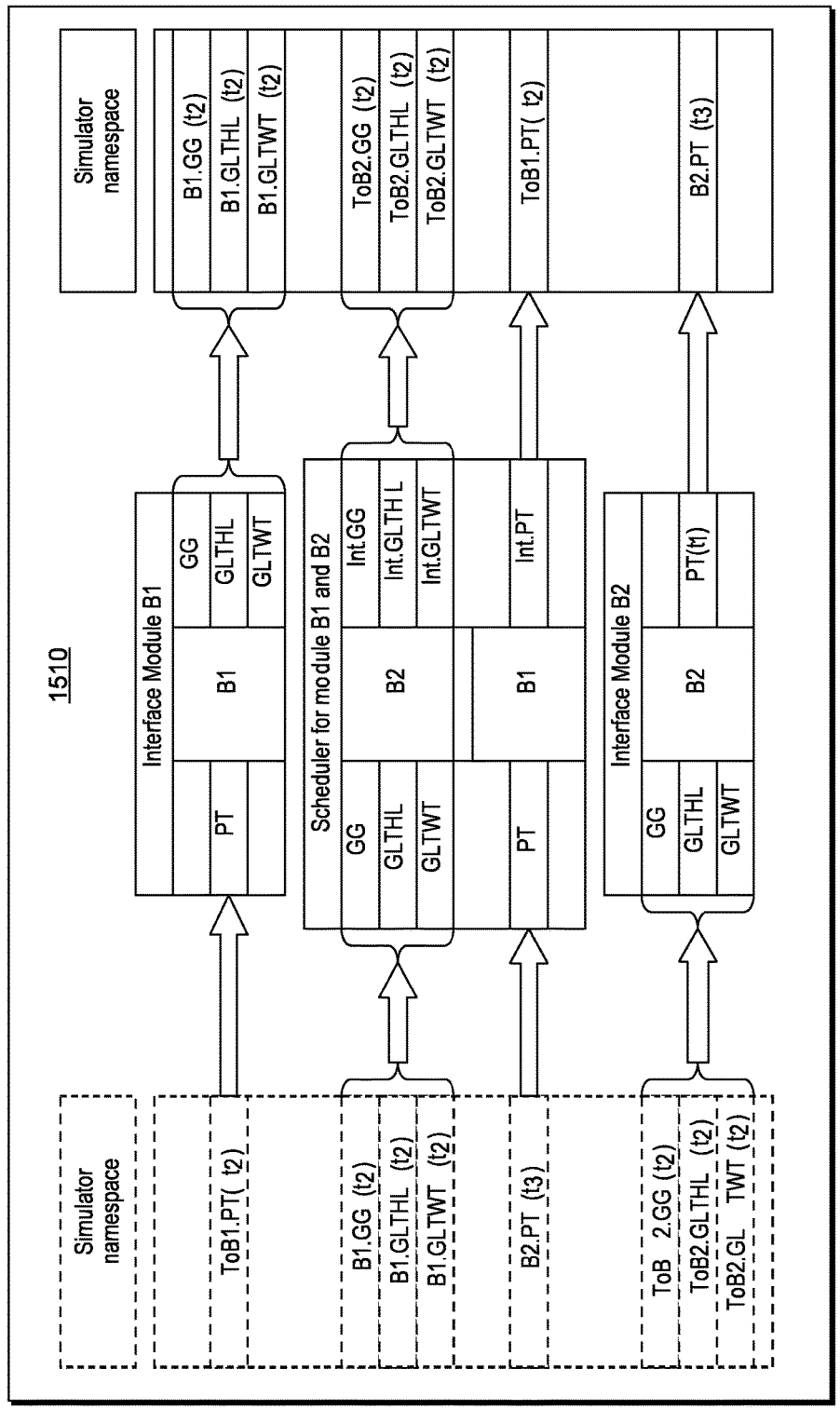
FIG. 15 illustrates an example of a scheduler at a particular time.

FIG. 15 shows a graphic 1510 that may be a "snapshot" of interface modules and a scheduler at a time $t_2$ at which time model B1 has integrated to time $t_1 \geq t_2$ where model B1 is the next one to run to integrate to $t_3 \geq t_1$.

Figure 16:
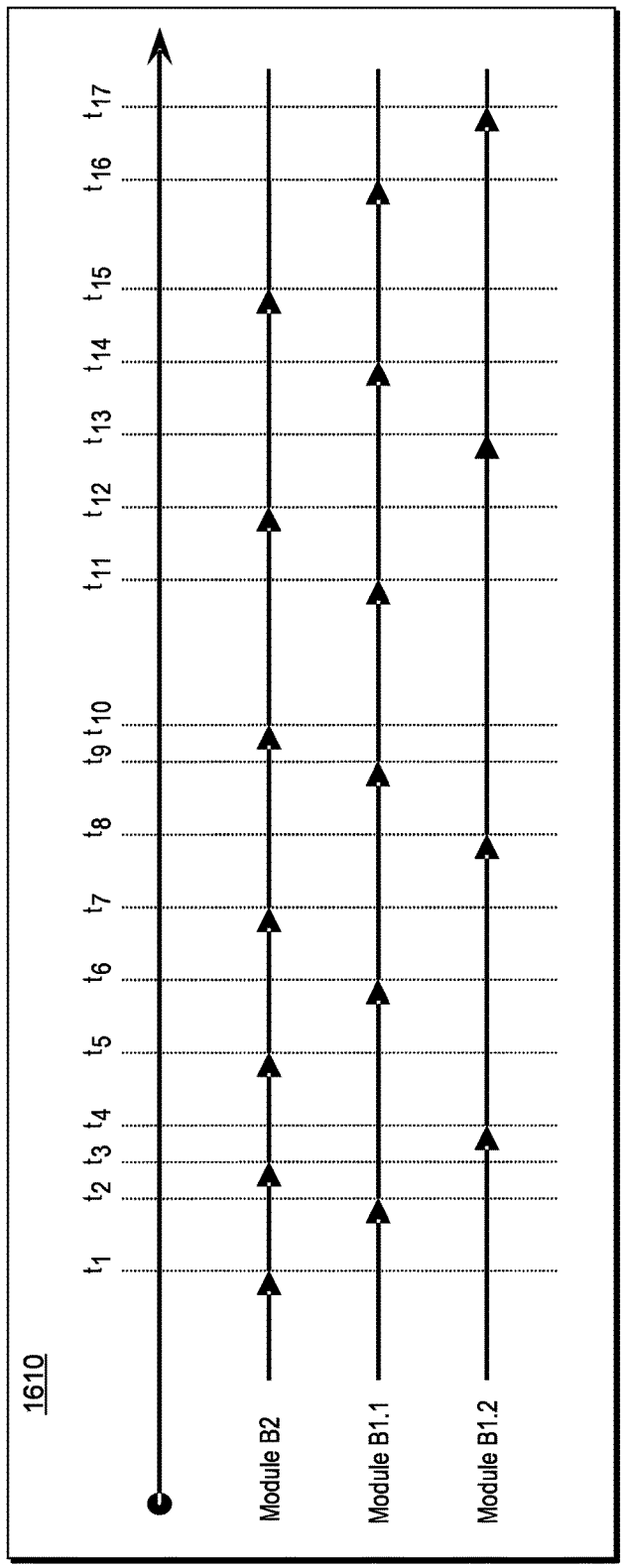
FIG. 16 illustrates an example of a time chart.
Figure 17:
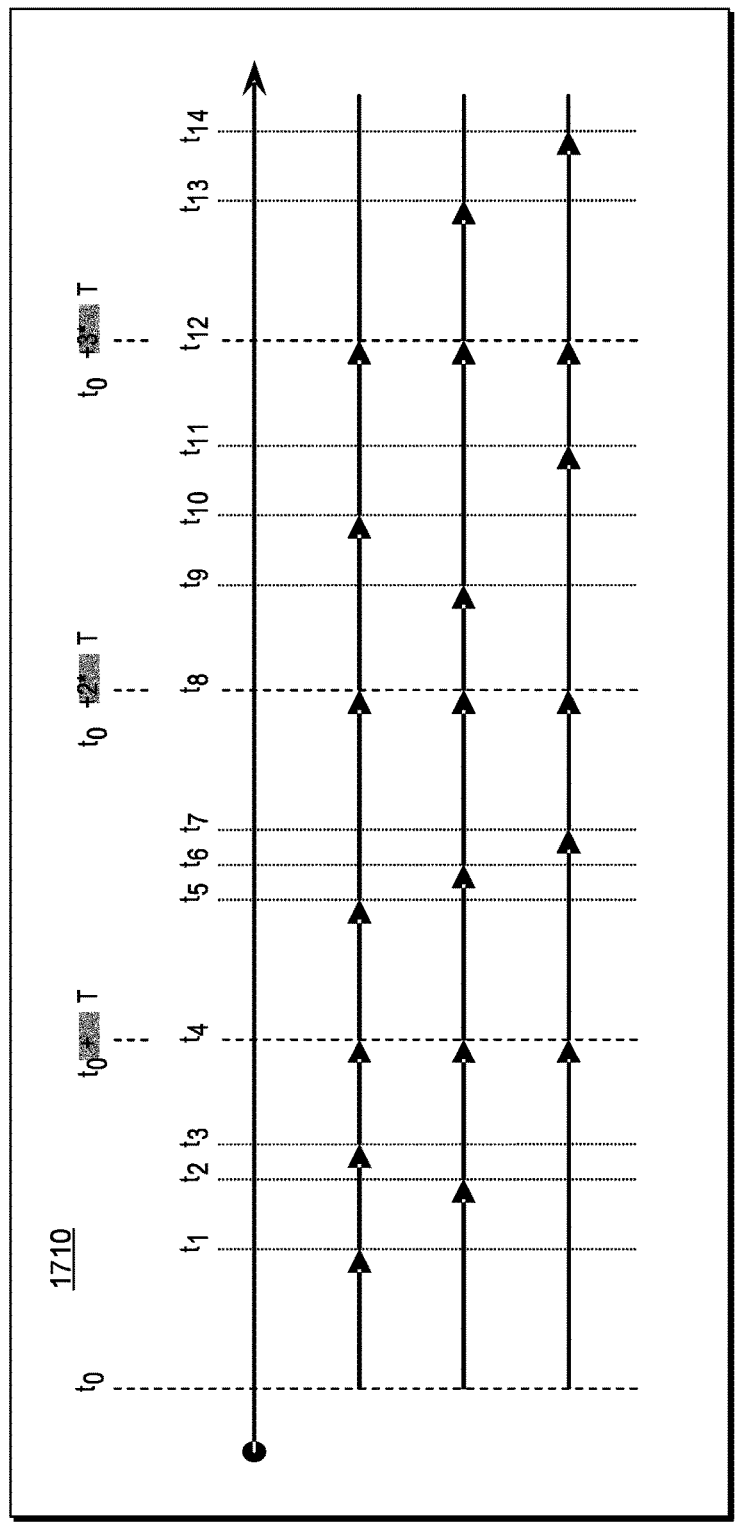
FIG. 17 illustrates an example of a time chart.

As to time synchronization, one or more approaches may be implemented. For example, consider relaxed time-synchronization and strict time-synchronization. FIGS. 16 and 17 show time charts 1610 and 1710, respectively, which illustrate concepts of relaxed and strict time synchronization.

As to strict time synchronization between interface modules, sample time can be specified for a scheduler. For example, a sample time may be an eight byte float input tag to a scheduler. Where a sample time is less than or equal to zero, a scheduler may operate in a relaxed time-synchronization mode (e.g., rather than a strict time-synchronization mode).

As shown in FIG. 16, the time chart 1610 for relaxed time-synchronization, there is no condition that assures modules have common time points. In such an example, a task of a scheduler can be to run the module that is lagging in time. If two or more modules are at the same time, the module that has the smallest time step HT may be selected to run.

The time chart 1610 illustrates an example of sequential scheduling with relaxed time-synchronization, which represents what may be achieved when it is desirable for sub-models to run on independent time steps without strict synchronization.

As illustrated in FIG. 16, a scheduler's current time is represented with the time of the module that is lagging in time. For instance, when module B1.2 is lagging at time $t_8$, module B1.1 has been integrated to time $t_9$ and module B2 has been integrated to time $t_{10}$, the representation of the scheduler's current time is be $t_8$. Next, when module B1.2 is integrated to $t_{13}$ the module lagging in time is B1.1 then the current time of the scheduler is $t_9$.

As an example, in relaxed time-synchronization, time stamps of tags from different modules can be different, unless, for example, models are set up with corresponding fixed time step(s).

As mentioned, FIG. 17 shows the time chart 1710 as to strict time-synchronization, which implies that tags are updated on fixed time steps (e.g., in the simulator namespace) and that the tags are available at these time points. Both fixed and relaxed time synchronization may have the same properties with respect to system stability of the interconnected multiphase flow network.

As an example, a method can include parallel scheduling with strict time-synchronization on a larger time interval indicated by $\Delta T$ in the time chart 1710 of FIG. 17. As an example, strict time-synchronization on each of the major time steps $t_0+\Delta T$, $t_0+2*\Delta T$, etc., may be enforced or not enforced. For example, as to non-enforcement, this means that the minor time steps $t_4$ can be slightly above $t_0+\Delta T$ and for each of the sub-models they might be a bit different. In such an example, the difference can be quantified in the time step of each individual sub-model $HT_j$.

As an example, a major time step $\Delta T$ may vary (e.g., may not be constant). For example, the major time step may be calculated by a scheduler. In such an example, a major time step may have an initial value set in a GUI dialog where, as soon as the system starts to run, the major time step is calculated based at least in part on simulation speed and, for example, minor time steps from individual sub-models $HT_j$.

As an example, a method may include implementing a time step control. For example, consider a time step control based on change in mass for phases in a control volume.

As an example, implementation of a time step control may include setting up input and adding new criterion as well as implementing one or more new criteria (e.g., phase j, section i, boundary k, etc.). Such a method may proceed according to the following example algorithm.

Example Algorithm

```
Delta f(i,j) = sum{fin(j,k)} - sum{fout(j,k)} - phase transfer from phase j
    Account for phase transfer?
if ( Delta f(i,j) < -Small)
    Deta t(i,j) = MassChangeFactor * m(i,j) / std::abs(Delta f(i,j))
else if( Delta f(i,j) > Small)
    Deta t(i,j) = MassChangeFactor * (V*alpha_g*rho(i,j) - m(i,j)) / Delta f(i,j)
else
    Deta t(i,j) = Large;
fin(i,j) - mass flow of phase j into CV
fout(i,j) - mass flow of phase j out of CV
m(i,j) - mass of phase j
Max Time Step = min {other crit, Deta t(i,j)}
```

Implementing a time step control may include testing one or more new criteria for pipeline applications and, in some embodiments, using a mass change criterion for a node model, both internal and boundary. Implementation may further include implementing HTO—a time step for object output variable for source (control volume, CV) and node (CV).

As an example, a method may proceed to HTO for controllers and transmitters. The method may include implementing HTO—time step for object output variable for controllers and transmitters.

As an example, a method may proceed to time step control for flow and signal connections. Such time step control may include automatically applying a new time step criterion to one or more control volumes (CVs) for flow connections, nodes, and sections that are used in flow connection. For terms FLOWIN, FLOWOUT, SIGNALIN, SIGNALOUT, a time step may be added as HT (HT for object), an output control variable such as PTBOU, CGG-BOU (mode variables) PT, CMG (source variables), etc. A configuration may, in some embodiments, be manual. Further, cases with flow and signal connections may be updated.

In an example embodiment, a scheduler may control one HTEXT term for each sub-model. As mentioned, a scheduler may modify a time step of a sub-model. For example, a scheduler may shorten a time step in an upstream model if the time step of the source CV behind FLOWIN is shorter. Thus, a model may account for an external time step HTEXT on each of its interface objects FLOWIN, FLOWOUT and SIGNALIN or on a global HTEXT input key (e.g., as in a key and keyword type of nomenclature system; see, e.g., the ECLIPSE® simulator, etc.).

As an example, a scheduler may not control HTEXT; rather, one or more of sources, nodes, controllers, and transmitters may implement a new HTEXT term that can be used to shorten a time step according to an external object. An effective time step for such an object may then be a minimum of an existing time step and HTEXT.

As an example, an approach may include the HTEXT term on one or more sources, nodes, controllers and transmitters. As an example, a sub-model A may have two connections to sub-model B, one to C, and one to D. As an example, where a scheduler does not control HTEXT, this will give four variable connections to four different destinations in sub-model A, plus at least one additional variable connection for sub-models B, C, and D to set HTEXT for these models. As an example, for OLGA-to-OLGA model connections, this may be accomplished automatically as part of FLOWIN/FLOWOUT and SIGNALIN/SIGNALOUT connections.

Where a scheduler does control HTEXT, there may be one HTEXT in sub-model A, and no new keys may be required on nodes, sources, controllers and transmitters, except for the HTEXT key defined on the INTEGRATION keyword.

Logic may be implemented in the scheduler. A minimum of the four HTOs and set it into the HTEXT input item sub-model A. In addition it may involve one HTEXT input for sub-model B, C and D.

As an example, backward compatibility may be facilitated by making the HTO→HTEXT connection optional. As an example, a method may include sub-modeling time step control testing, and sub-modeling time step control documentation. Such a method may then update documentation to include HTO and HTEXT.

As an example, a method may simulate physical real production networks and systems, in a rigorous manner, so that results adhere to measured data in the real production systems. The simulation speed may be one of the properties in simulators and models. Fast achievable speed without sacrificing engineering precision may be desired.

As an example, engineering models and simulator engines may be used in production forecasting and in on-line systems for surveillance monitoring. For example, consider a feature in an online system that provides for look-ahead functionality, running faster than real time, and thereby implementing advanced warring systems and production optimization strategies. Another feature of an online system may be retuning strategies, for example, rerunning preceding horizons to optimize model parameters.

As an example, a scheduler and associated modules may be run with respect to a framework or frameworks. For example, consider a modeling framework that allows for building of models. As an example, information may be exchanged between frameworks, between modules, etc.

Figure 18:
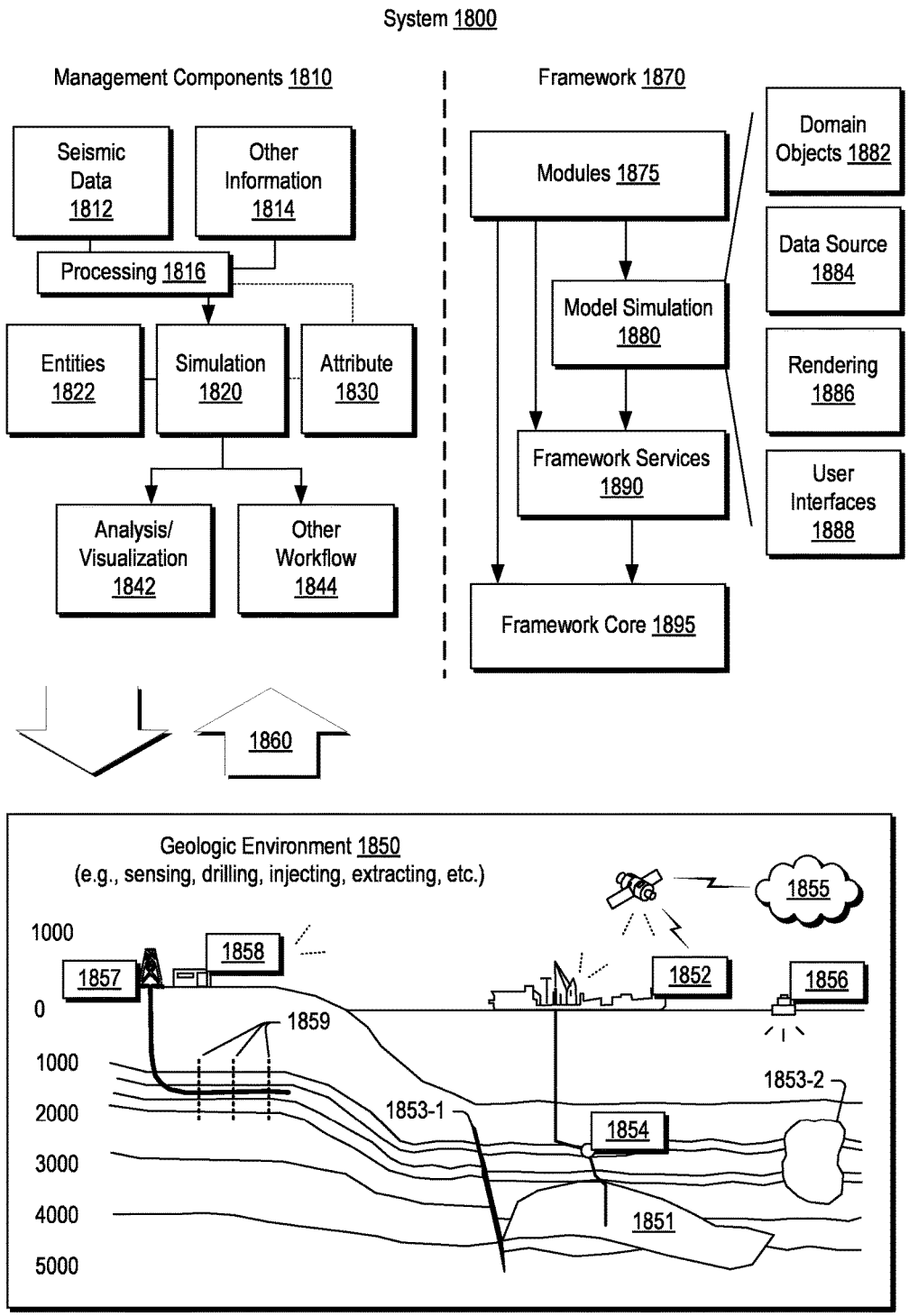
FIG. 18 illustrates an example of a system and an example of a geologic environment and equipment.

FIG. 18 shows an example of a system 1800 that includes various management components 1810 to manage various aspects of a geologic environment 1850 (e.g., an environment that includes a sedimentary basin, a reservoir 1851, one or more faults 1853-1, one or more geobodies 1853-2, etc.). For example, the management components 1810 may allow for direct or indirect management of sensing, drilling, injecting, extracting, etc., with respect to the geologic environment 1850. In turn, further information about the geologic environment 1850 may become available as feedback 1860 (e.g., optionally as input to one or more of the management components 1810).

In the example of FIG. 18, the management components 1810 include a seismic data component 1812, an additional information component 1814 (e.g., well/logging data), a processing component 1816, a simulation component 1820, an attribute component 1830, an analysis/visualization component 1842 and a workflow component 1844. In operation, seismic data and other information provided per the components 1812 and 1814 may be input to the simulation component 1820.

In an example embodiment, the simulation component 1820 may rely on entities 1822. Entities 1822 may include earth entities or geological objects such as wells, surfaces, bodies, reservoirs, etc. In the system 1800, the entities 1822 can include virtual representations of actual physical entities that are reconstructed for purposes of simulation. The entities 1822 may include entities based on data acquired via sensing, observation, etc. (e.g., the seismic data 1812 and other information 1814). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 1820 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 18, the simulation component 1820 may process information to conform to one or more attributes specified by the attribute component 1830, which may include a library of attributes. Such processing may occur prior to input to the simulation component 1820 (e.g., consider the processing component 1816). As an example, the simulation component 1820 may perform operations on input information based on one or more attributes specified by the attribute component 1830. In an example embodiment, the simulation component 1820 may construct one or more models of the geologic environment 1850, which may be relied on to simulate behavior of the geologic environment 1850 (e.g., responsive to one or more acts, whether natural or artificial). In the example of FIG. 18, the analysis/visualization component 1842 may allow for interaction with a model or model-based results (e.g., simulation results, etc.). As an example, output from the simulation component 1820 may be input to one or more other workflows, as indicated by a workflow component 144.

As an example, the simulation component 1820 may include one or more features of a simulator such as the ECLIPSE® reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 1810 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 1810 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 18 also shows an example of a framework 1870 that includes a model simulation layer 1880 along with a framework services layer 1890, a framework core layer 1895 and a modules layer 1875. The framework 1870 may include the commercially available OCEAN® framework where the model simulation layer 1880 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 18, the model simulation layer 1880 may provide domain objects 1882, act as a data source 1884, provide for rendering 1886 and provide for various user interfaces 1888. Rendering 1886 may provide a graphical environment in which applications can display their data while the user interfaces 1888 may provide a common look and feel for application user interface components.

As an example, the domain objects 1882 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 18, data may be stored in one or more data sources (or data stores, generally physical data storage devices), which may be at the same or different physical sites and accessible via one or more networks. The model simulation layer 1880 may be configured to model projects. As such, a particular project may be stored where stored project information may include inputs, models, results and cases. Thus, upon completion of a modeling session, a user may store a project. At a later time, the project can be accessed and restored using the model simulation layer 1880, which can recreate instances of the relevant domain objects.

In the example of FIG. 18, the geologic environment 1850 may include layers (e.g., stratification) that include a reservoir 1851 and one or more other features such as the fault 1853-1, the geobody 1853-2, etc. As an example, the geologic environment 1850 may be outfitted with any of a variety of sensors, detectors, actuators, etc. For example, equipment 1852 may include communication circuitry to receive and to transmit information with respect to one or more networks 1855. Such information may include information associated with downhole equipment 1854, which may be equipment to acquire information, to assist with resource recovery, etc. Other equipment 1856 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 18 shows a satellite in communication with the network 1855 that may be configured for communications, noting that the satellite may additionally or alternatively include circuitry for imagery (e.g., spatial, spectral, temporal, radiometric, etc.).

FIG. 18 also shows the geologic environment 1850 as optionally including equipment 1857 and 1858 associated with a well that includes a substantially horizontal portion that may intersect with one or more fractures 1859. For example, consider a well in a shale formation that may include natural fractures, artificial fractures (e.g., hydraulic fractures) or a combination of natural and artificial fractures. As an example, a well may be drilled for a reservoir that is laterally extensive (e.g., a formation present as a substantially horizontal layer or layers). In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 1857 and/or 1858 may include components, a system, systems, etc. for fracturing, seismic sensing, analysis of seismic data, assessment of one or more fractures, etc.

As mentioned, the system 1800 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 21:
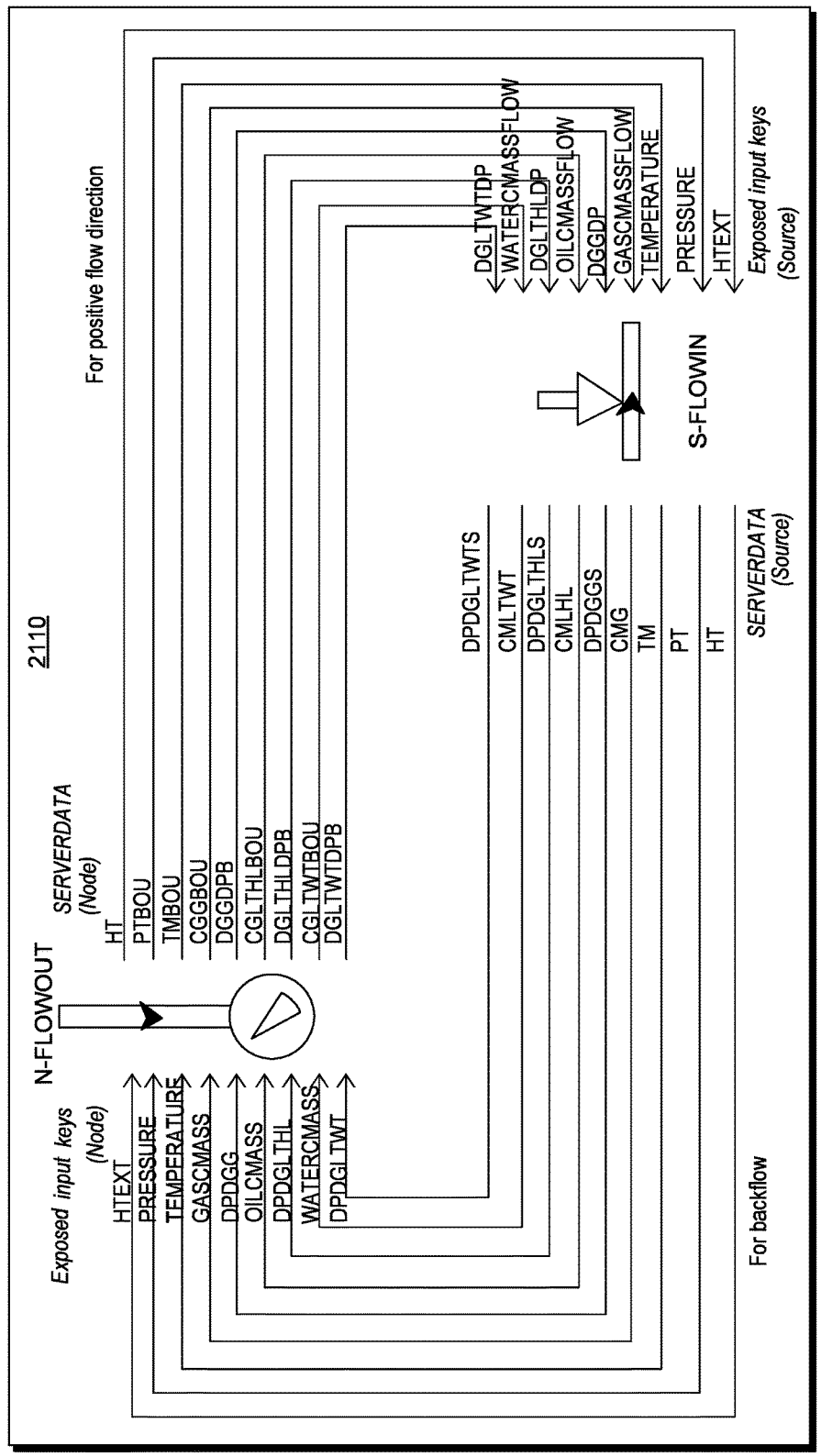
FIG. 21 illustrates an example of a connection diagram for flow connection variables.
Figure 22:
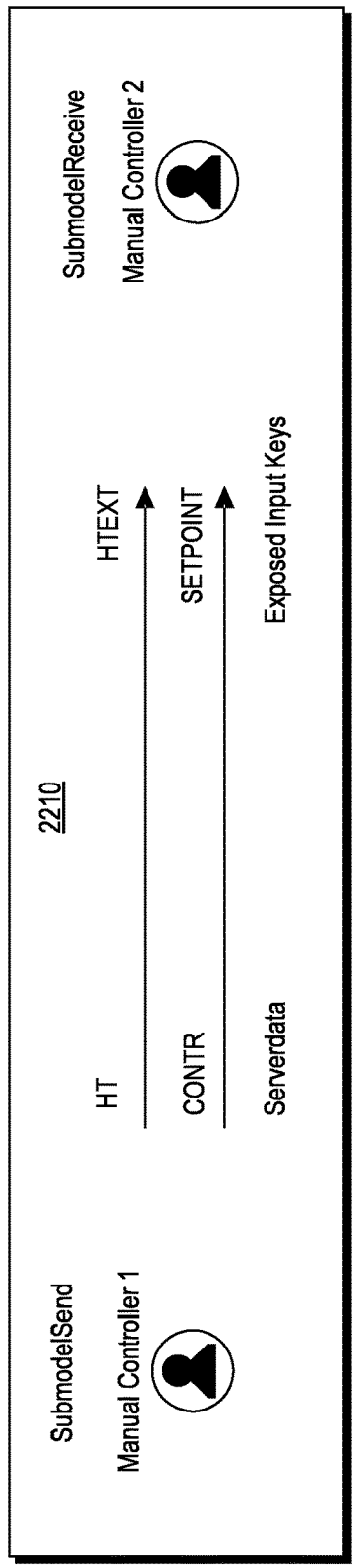
FIG. 22 illustrates an example of a connection diagram for signal connection variables.

As an example, a framework may provide for an overall look and feel of graphical user interfaces (GUI). FIGS. 19, 20, 23 and 24 show examples of GUIs 1910, 2010, 2310 and 2410. FIGS. 21 and 22 show examples of connection diagrams 2110 and 2210, which may optionally be implemented via one or more GUIs. For example, a module may provide for rendering a connection diagram to a portion of a GUI where one or more graphic controls may be implemented to interact with the connection diagram (e.g., for editing one or more connections, etc.).

Figure 19:
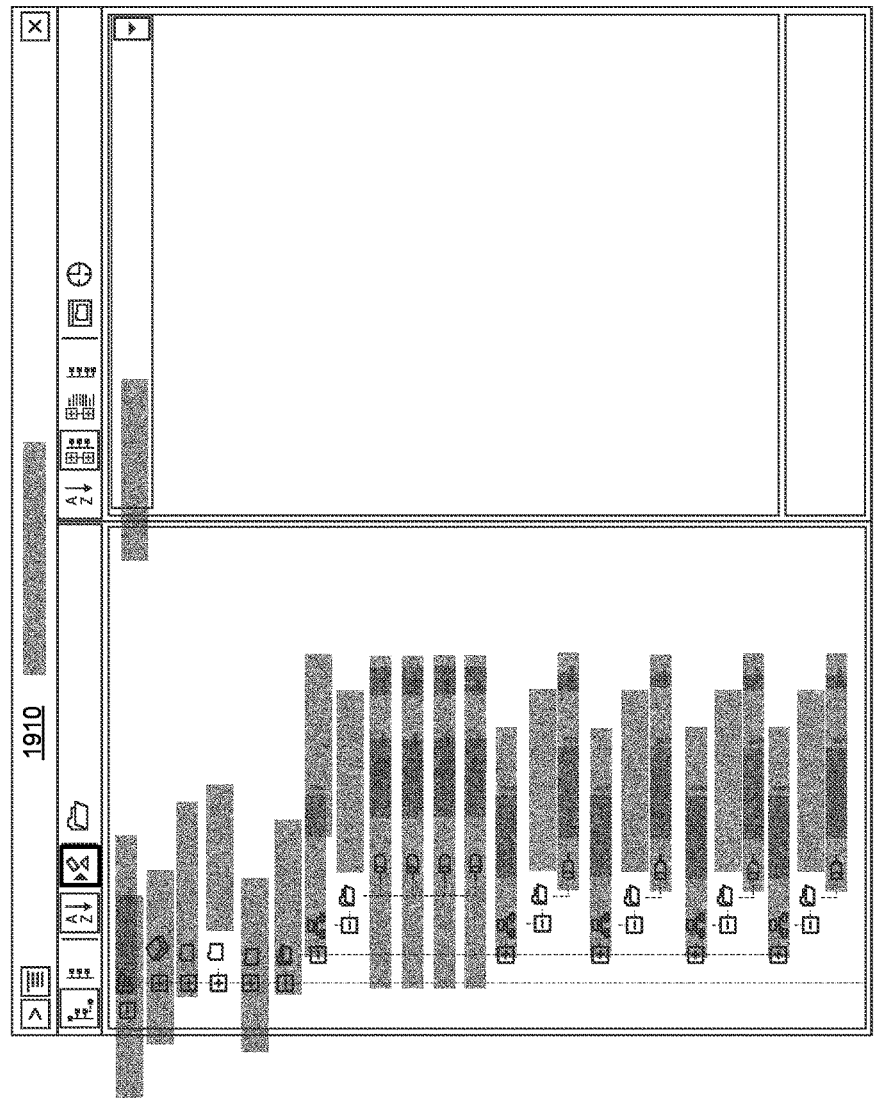
FIG. 19 illustrates an example of a graphical user interface.

The GUI 1910 of FIG. 19 shows an example of a sub-model approach where a sub-model may be defined (e.g., PipelineABCD). As an example, the GUI 1910 may be a model browser in that it can allow for navigating information germane to models. As shown, a model namespace may be indicated for a sub-model. As shown, a menu with expandable and contractable item listing may allow for actions with respect to coupling (e.g., flow, etc.) as well as sub-model definition.

The GUI 2010 of FIG. 20 shows an example of a sub-model connections approach where flow out and flow in may be defined. For example, as shown in the example GUI 2010, flow out of wells A, B, C and D may be defined as well as flow in with respect to F2, F4 and F5. As an example, the GUI 2010 of FIG. 20 can include a signal tab, for example, to specify signal "ins" and "outs".

The connection diagram of 2110 of FIG. 21 shows an example of variables transferred in flow connections. For example, consider flow from a well model to be connected to a pipeline model where this may be accomplished by establishing a sub-modeling flow connection between a pressure node "N-FLOWOUT" and source node "S-FLOWIN". In such an example, a scheduler may provide for time synchronization between the well model and the pipeline model; for example, for transferring flow connection data between "N-FLOWOUT" and "S-FLOWIN". As an example, to make sub-model connections, a method may include adding SERVERDATA for the output variables and EXPOSE for the input keys.

The connection diagram 2210 of FIG. 22 shows an example of signal variables with respect to a sub-model send action and a sub-model receive action. As an example, signal connections between sub-models may be suitable for reuse of controller logic across sub-model or signal communication between sub-models. As an example, consider a case with a manual controller that provides information as to ambient air temperature. Such a controller value can be transferred to the sub-models and used appropriately. As an example, if a user changes the value of the manual controller in a server simulation, the change can propagate down to the sub-models. As an example, a scenario can include making a connection over sub-models from a transmitter to a controller (e.g., make a server data containing OUTSIG on a transmitter, then select the transmitter and variable OUTSIG in the SIGNALOUT keyword).

The connection diagram 2210 of FIG. 22 shows a scenario for SubmodelSend.opi and SubmodelReceive.opi, both including a manual controller. In the scenario, it is possible to use the output signal of controller one as input to controller two.

As shown in FIGS. 21 and 22, signals may be defined to be one directional; whereas flow connection may be bi-directional for mutually dependent sub-models.

As to various terms used in the connection diagrams 2110 and 2210, consider definitions as follow in Table 1, below.

TABLE 1

| Example Variables | |
|---|---|
| Flowout/NODE input variables: | |
| HTEXT | External time step limit. If HTEXT is less than or equal to zero, external time step limit is disabled. |
| PRESSURE | Boundary pressure. For internal nodes, this can be used in conjunction with INITIALCONDITIONS to specify the initial pressure. |
| TEMPERATURE | Temperature of the inflow mixture on boundary nodes. For internal nodes, this can be used in conjunction with INITIALCONDITIONS to specify the initial temperature. |
| GASCMASS | Normalized gas masses for each component (volume fractions multiplied by density) |
| DPDGG | Pressure - gas mass flow differential |
| OILCMASS | Normalized oil masses for each component (volume fractions multiplied by density) |
| DPDGLTHL | Pressure - oil mass flow differential |
| WATERCMASS | Normalized water masses for each component (volume fractions multiplied by density) |
| DPGLTWT | Pressure - water mass flow differential |
| Flowout/NODE output vars: | |
| HT | Time step |
| PTBOU | Pressure at boundary node |
| TMBOU | Fluid temperature at boundary node |
| CGGBOU | Gas mass flow for each component at boundary node |
| DGGDPB | Gas mass flow derivative w.r.t. pressure at boundary node |
| CGLTHLBOU | Oil mass flow for each component at boundary node |
| DGLTHLDPB | Oil mass flow derivative w.r.t. pressure at boundary node |
| CGLTWTBOU | Water mass flow for each component at boundary node |
| DGLTWTDPB | Water mass flow derivative w.r.t. pressure at boundary node |
| Flowin/SOURCE input vars: | |
| DGLTWTDP | Water mass flow - pressure differential |
| WATERCMASSFLOW | Water mass flow rate. For compositional tracking it can be the flow rate of the water phase for each component. |
| DGLTHLDP | Oil mass flow - pressure differential |
| OILCMASSFLOW | Oil mass flow rate. For compositional tracking it can be the flow rate of the oil phase for each component. |
| DGGDP | Gas mass flow - pressure differential |
| GASCMASSFLOW | Gas mass flow rate. For compositional tracking it can be the flow rate of the gas phase for each component. |
| TEMPERATURE | Mixture temperature of the mass flow rate at points in time specified. |
| PRESSURE | Upstream pressure for a positive source (flow into pipeline). Downstream pressure for a negative source. Used for pressure driven source. |
| HTEXT | External time step limit. If HTEXT is less than or equal to zero, external time step limit is disabled. |
| Flowin/SOURCE output vars: | |
| DPDGLTWTS | Pressure derivative w.r.t. water mass flow |
| CMLTWT | Mass in water phase. For compositional tracking it can be the mass of the water phase for each component. |

TABLE 1-continued

Example Variables

| | |
|---|---|
| DPDGLTHLS | Pressure derivative w.r.t. oil mass flow |
| CMLTHL | Mass in oil phase. For compositional tracking it can be the mass of the oil phase for each component. |
| DPDGGS | Pressure derivative w.r.t. gas mass flow |
| CMG | Mass in gas phase. For compositional tracking it can be the mass of the gas phase for each component. |
| TM | Fluid temperature |
| PT | Pressure |
| HT | Time step |
| SignalOut (CONTROLLER or TRANSMITTER) output vars: | |
| HT | Time step |
| CONTR | Controller output |
| SignalIn (MANUALCONTROLLER) input vars: | |
| HTEXT | External time step limit. If HTEXT is less than or equal to zero, external time step limit is disabled. |
| SETPOINT | Setpoint values. |

Figure 23:
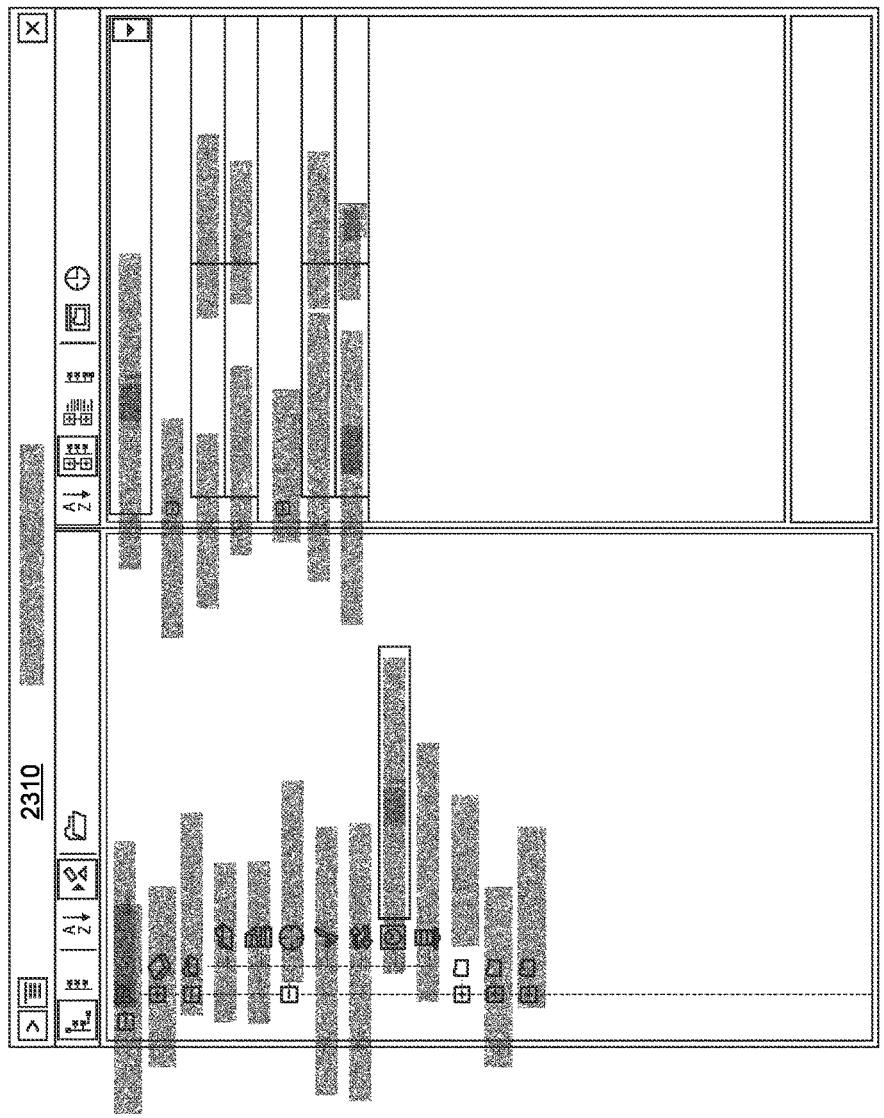
FIG. 23 illustrates an example of a graphical user interface.

The GUI 2310 of FIG. 23 shows an example of a scheduler approach where aspects of a scheduler may be defined, navigated, etc. (see, e.g., SchedABCD). As shown in the example of FIG. 23, running state, simulator clock, time step, etc. may be rendered and optionally adjusted.

Figure 24:
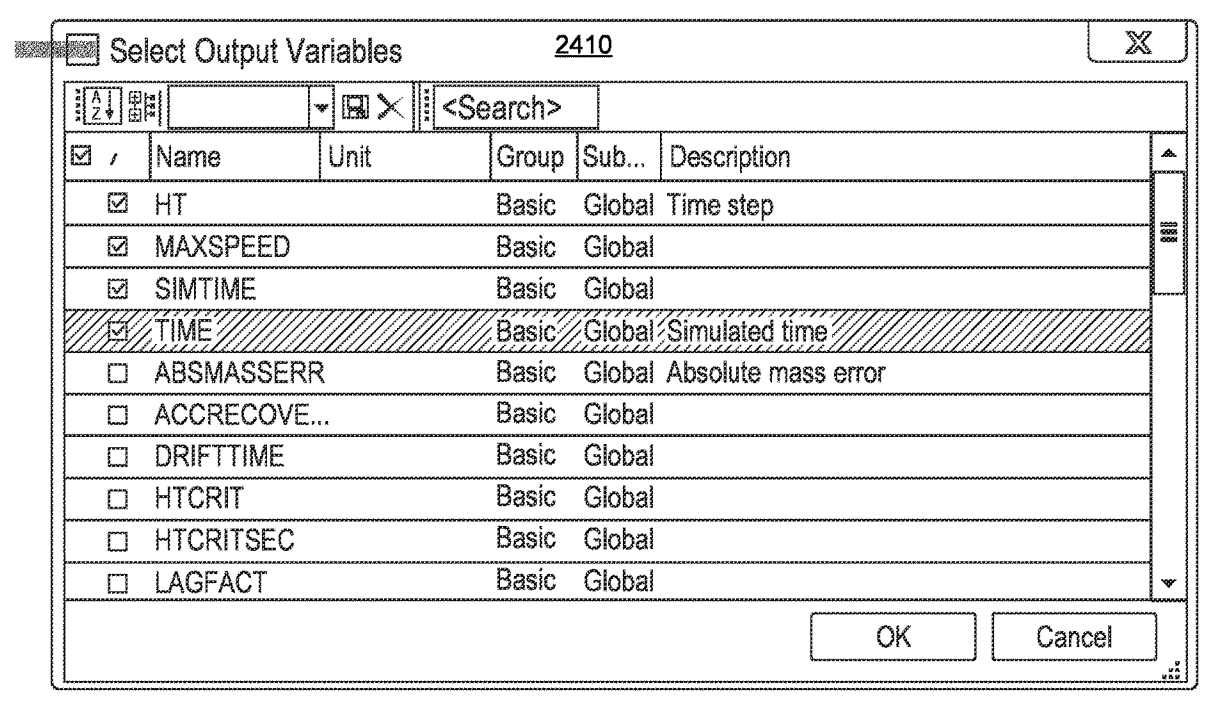

The GUI 2410 of FIG. 24 shows an example of an output variable selection tool. As shown, names and descriptions of output variables may be rendered to a display. Graphic controls such as, for example, check boxes may allow for selection of one or more output variables. As an example, a GUI may provide for definition of input variables. For example, consider a GUI that allows for exposing input variable for one or more connection points. Specifically, the example GUI 2410 of FIG. 24 shows some examples of global output data that can be utilized to control time scheduling (see, e.g., TIME and HT).

As an example, a GUI may provide for setting one or more control item inputs. For example, consider simulation speed as an input, which may be an input to one or more sub-models. As an example, consider an external clock input where it may be an input to different sub-models. As an example, a sub-model task can be to keep up with updates provided on an external clock subject to a constrained simulation speed.

As an example, a scheduler can update an external clock and simulation speed to sub-models at an appropriate basis, for example, at major time step increments (see, e.g., ΔT).

As an example, a method can include providing a common simulation speed to sub-models such that they may run approximately with the same speed. In such an example, they may, as appropriate, communicate flow connection variables at each minor time step (e.g., without being too far off from each other). As an example, a time scheduling scheme may allow for parallel running on one or more computers (e.g., consider virtual machines implemented on a single computing device). As an example, speed of a full model may be almost as fast as speed of a slowest model.

As an example, a sub-model output item referred to as NCLOCKS can display how many ExternalClock updates a sub-model has received. As an example, such ExternalClock updates may be handled by a scheduler, which can include its own NCLOCKS item.

As an example, a submodel output item referred to as NsynchOps can be an indicator for a number of external inputs received that resulted in a shift (e.g., discontinuity) in one or more of SIMTIME, TIME and INITTIME variables. As an example, operations that can trigger such a shift can include: command SetTime, command LoadSnap, and writing to the input item INITTIME. Trigging of one of these operations is referred to as a reference time shift event.

When a reference time shift event occurs, a sub-model will communicate the successful completion of the operation by incrementing the NsynchOps output item with one. The NsynchOps item can be updated after other affected items, thus the increment to the NsynchOps item is guaranteed to be the last event affected by the operation. This makes the item usable when implementing synchronous operations (e.g., operations where one wants to request an operation and wait until it has completed).

As an example, to implement a synchronous handling of a reference time shifting event the following example algorithm may be implemented:
1. Read the current value of NsynchOps
2. Do the desired operation
3. Wait for NsynchOps to increase
4. Re-read inputs/outputs that may be affected by the event.
5. Continue with normal operation (e.g., update external clocks)

As an example, a scheduler output item referred to as SYNCHINTERVAL can be a current time increment that the scheduler has calculated for sub-model external clocks. As an example, a SYNCHINTERVAL can be a function of the current simulation speed and the size of the current sub-model time steps ($HT^{sub}$).

As an example, a MAJORTIMESTEP key can be used to specify an initial increment to external clocks. Thus, the very first SYNCHINTERVAL can be equal to MAJORTIMESTEP.

As an example, scheduling and strategy for reducing inter-sub-model time drift may be implemented. For example, the end of each SYNCH INTERVAL represents a time barrier. Consider the following example definition:

$$TimeBarrier_j = INITTIME^{sched} + \sum_{i=1}^{j} SYNCHINTERVAL_i^{sched}$$

In such an approach, note that for a current time barrier, the subscript j is the same as the value of $\text{NCLOCKS}^{sched}$.

As an example, at each time barrier, a scheduler can control sub-models able to keep up with the simulation. For example, an active sub-model has to catch up with the time barrier before the sub-models will receive a new update to their external clocks. As an example, a scheduler may act to ensure that the following conditions are fulfilled for active sub-models at each time barrier:

$$\text{SIMTIME}_{k-1}^{sub} < \text{TimeBarrier}_j \leq \text{SIMTIME}_k^{sub},$$
$$\text{SIMTIME}_k^{sub} = \text{SIMTIME}_{k-1}^{sub} + \text{HT}_{k-1}^{sub}$$

where the subscript k represents the number of internal integration steps performed by the sub-model; noting that k is not the same as $\text{NCLOCKS}^{sub}$, generally k tends to be considerably larger (e.g., it may be displayed by the output variable NINTGR) and further noting that each sub-model may overshoot a time barrier with at most $\text{HT}_{k-1}^{sub}$.

As an example, between $\text{TimeBarrier}_j$ and $\text{TimeBarrier}_{j+i}$ sub-models can be, in principle, free-running. As an example, sub-models can run at least in part in parallel. As an example, a scheduler can lock a simulation speed of the sub-models to a currently requested speed or a calculated maximum possible speed (e.g., MAXSPEED) where, for example, the slowest sub-model is able to follow. Thus, the sub-models may be asked to run at the speed the scheduler requests; however, a method can allow sub-models to find out how to best achieve that speed.

Figure 25:
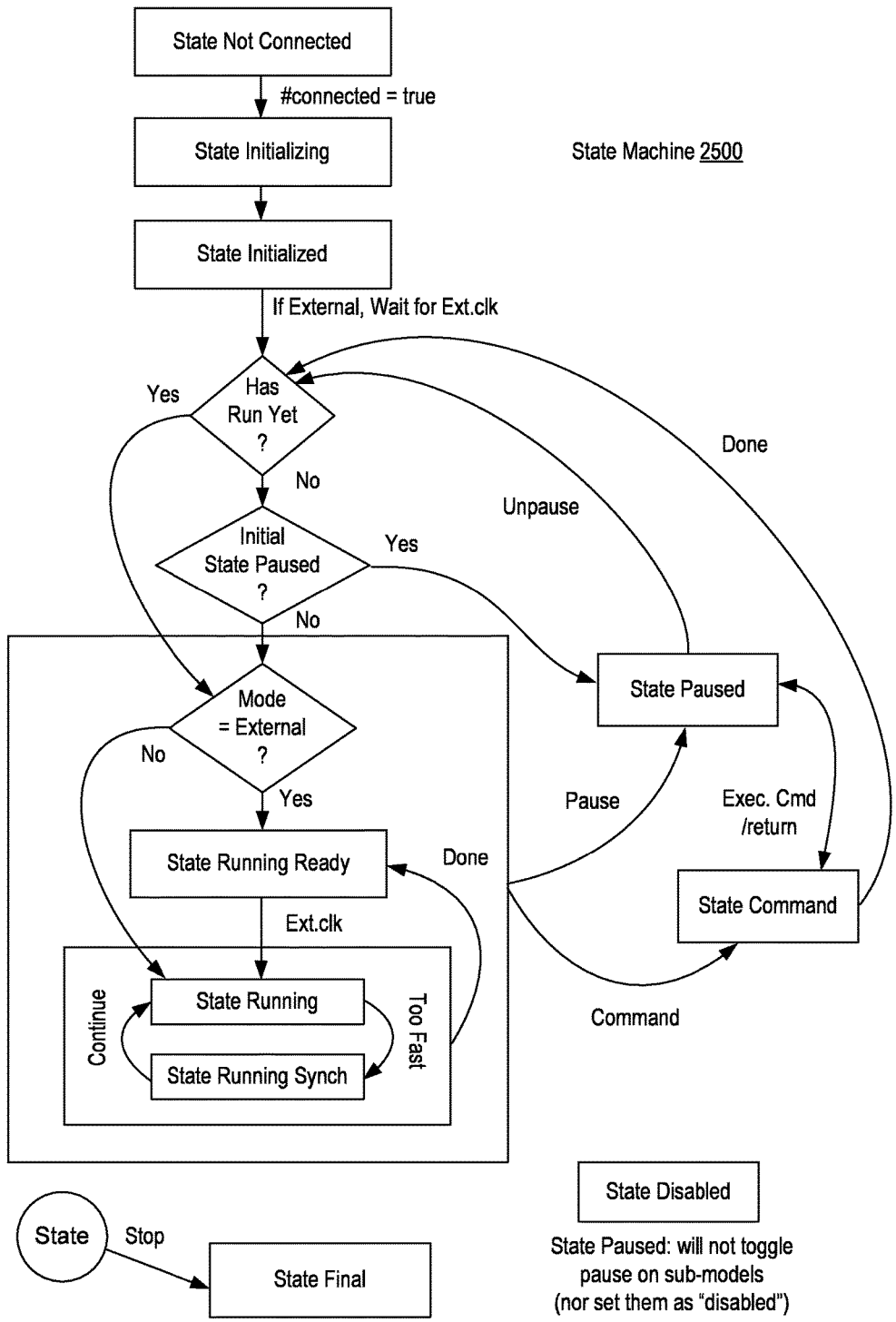
FIG. 25 illustrates an example of a state machine.

FIG. 25 shows an example of a state machine 2500. The state machine 2500 may be implemented using various equipment (e.g., one or more computers, etc.). As an example, a scheduler may run sub-models in parallel where, at certain intervals (e.g., optionally automatically determined by the scheduler), the sub-models can be synchronized in time. As an example, length of such intervals may be displayed in a SYNCHINTERVAL item on a scheduler OPC server. As an example, points in time where synchronization occurs may be referred to as synchronization points. As an example, at a synchronization point, a scheduler can hold back one or more sub-models until members of a set of sub-models have reached (e.g., or passed by at most one time step, HT) the synchronization point.

Information exchange may occur during a simulation. For example, between synchronization points, a scheduler may control simulation speed (e.g., SIMULATIONSPEED parameter) of sub-models so that they will simulate at a relatively common pace and, for example, reach a synchronization point at approximately the same time. Between each synchronization point, various sub-models can exchange information (e.g., flow and signal parameters), for example, in a relatively continuous manner. For example, output values from an upstream sub-model can be interpolated in time and passed on as input values to a connected downstream sub-model.

As an example, synchronous operations may be controlled by a scheduler. As an example, some possible example operations (e.g., external inputs) on a scheduler may cause a shift (e.g., a discontinuity) in SIMTIME, TIME or INITTIME variables. For example, operations that can trigger such a shift can include: command SetTime; command LoadSnap; and writing to the input item INITTIME. As an example, such one or more operations may be executed in a synchronous manner; whereas, various other operations may be carried out asynchronously. As an example, when executing a synchronous operation, a scheduler may halt one or more new operations until affected sub-models have incremented their control item NsynchOps.

As an example, a system may implement external clocks. For example, a scheduler may automatically force sub-models in SIMULATORMODE=EXTERNAL when it starts up the sub-models. In such an example, the scheduler can write to the sub-model ExternalClock items to drive the simulation forward where, for example, each increment to the external clocks can correspond to one synchronization interval.

As an example, a sub-model output item NCLOCKS can display how many ExternalClock updates a sub-model has received. As an example, a scheduler can have its own NCLOCKS item; which shows how many SYNCH INTERVALS the scheduler has calculated.

Referring again to the example state machine 2500 of FIG. 25, it illustrates various scheduler operational states. As an example, a scheduler may be a state machine, for example, with one or more of the logical states and transition logic as illustrated in FIG. 25. As an example, a simulator sub-model state machine (e.g., of a simulation framework such as, for example, the OLGA™ framework) can include various states that may be akin to states of a scheduler state machine. In such an approach, on an OPC level, it may be relatively indistinguishable as to whether an executing model is a simulator sub-model or a scheduler. Such an approach can facilitate hierarchical sub-modeling as, for example, one scheduler can be set to control another scheduler as a sub-model. As mentioned, a simulator may be operatively coupled to equipment, for example, for data acquisition and/or control. As an example, states of a scheduler as a state machine may be utilized in performing one or more field operations, which may include data acquisition and/or control.

As an example, a simulation may include simulation threads. For example, when a simulation is started, a simulator may by default use as many simulation threads as there are physical CPU cores on a hosting platform (e.g., a computing system that hosts a framework or frameworks, etc.). As an example, such behavior may be modified globally by changing the number of simulation threads from the default in an options GUI or other manner. As an example, when starting a simulator from a command line, such an approach may be achieved by using an -n-threads command line switch.

As an example, for a sub-modelled case, the number of simulation threads can be set up by default and can be distributed evenly between sub-models. For instance, if a case has two sub-models and eight physical cores, by default each sub-model will get four simulation threads. As an example, a parameter CPURATIO on a SUBMODEL keyword may be used to direct more computational power to one sub-model at the cost of less computational power on another. While the example pertains to CPU ratio, such an approach may include one or more terms that associated one or more processing cores with one or more portions of a model, with a scheduler, with input operations, with output operations, etc.

While various examples refer to oil and/or gas production systems, networks, etc., as an example, a scheduler and sub-modeling approach may be implemented for one or more other types of systems. For example, where a physical system includes conduits (e.g., or conveyors, etc.) and pieces of equipment amenable to sub-modeling, such an approach may be implemented. As an example, a system may be a production system for producing a product or products. As an example, consider a production facility for one or more of a food product, for a detergent product (e.g., liquid, gel and/or solid), for a paint product, etc.

As an example, a method can include receiving a model of a fluid production network where the model includes a plurality of sub-models; synchronizing simulation of the plurality of sub-models with respect to time; and outputting values for fluid flow variables of the model. In such an example, a simulation can include a plurality of different time steps. As an example, a simulation can include common time points where a number of time steps for one of a plurality of sub-models differs from a number of time steps for another one of the plurality of sub-models at one of the common time points. As an example, two sub-models may reach one or more target times (e.g., common times) in a different number of time steps (e.g., x time steps for one sub-model and y time steps for the other sub-model where x differs from y).

As an example, a simulation can be performed for a number of models. For example, consider a production model, a pipeline network model and a plurality of well models where the pipeline network model is a sub-model of the production model and where the plurality of well models are sub-models of the pipeline network model.

As an example, a method can include synchronizing by performing simulation of a plurality of sub-models at least in part in parallel. In such an example, simulation of sub-models (e.g., sub-model based simulation) may be performed with respect to a time schedule that may be part of a scheduler.

As an example, a simulation may implement multiple processing cores. In such an example, cores may be assigned to sub-models, for example, an individual sub-model may be assigned an individual core or cores. As an example, a method can include synchronizing simulation by adjusting at least one time step associated with one of a plurality of sub-models.

As an example, a method can include synchronizing simulation for a plurality of sub-models where at least two of the sub-models are mutually dependent. For example, a scheduler may provide for information exchange between sub-models. As an example, a method can include synchronizing simulation in a manner that includes transferring information from one of a plurality of sub-models to another one of the plurality of sub-models.

As an example, a method can include synchronizing simulation in a manner that utilizes minor time steps and major time steps. As an example, a method can include synchronizing simulation in a manner that includes time stamping information generated by sub-model simulation (e.g., for one or more sub-models). For example, consider storing values for fluid flow variables for at least two times and interpolating the values with respect to time.

As an example, a system can include a processor; memory accessible by the processor; and modules that include processor-executable instructions where the instructions include instructions to instruct the system to receive a model of a fluid production network where the model includes a plurality of sub-models; synchronize simulation of the plurality of sub-models with respect to time; and output values for fluid flow variables of the model. In such an example, the modules can include a scheduler module. As an example, modules of a system can include an interface module (e.g., or interface modules).

As an example, a system can include an interface that receives information from at least one sensor of a fluid production network. As an example, a system can include modules that include at least one control module that outputs control commands to control at least one piece of equipment of a production network.

As an example, one or more computer-readable storage media can include computer-executable instructions executable by a computer where the instructions include instructions to: receive a model of a fluid production network where the model includes a plurality of sub-models; synchronize simulation of the plurality of sub-models with respect to time; and output values for fluid flow variables of the model. In such an example, the fluid production network can include a substantially vertical conduit and a substantially horizontal conduit where, for example, a time step for simulation of fluid flow in the substantially vertical conduit is less than a time step for simulation of fluid flow in the substantially horizontal conduit.

As an example, a substantially vertical conduit can be oriented at an angle with respect to horizontal that is greater than about 50 degrees. As an example, a substantially horizontal conduit can be oriented at an angle with respect to horizontal that is less than about 40 degrees (e.g., between −40 degrees and +40 degrees depending on whether sloping down or up with respect to a direction, which may be a flow direction).

As an example, a fluid production network can be or include a multiphase fluid production network. As an example, values output via a synchronized simulation process can include values for fluid flow variables at a plurality of different times.

Figure 26:
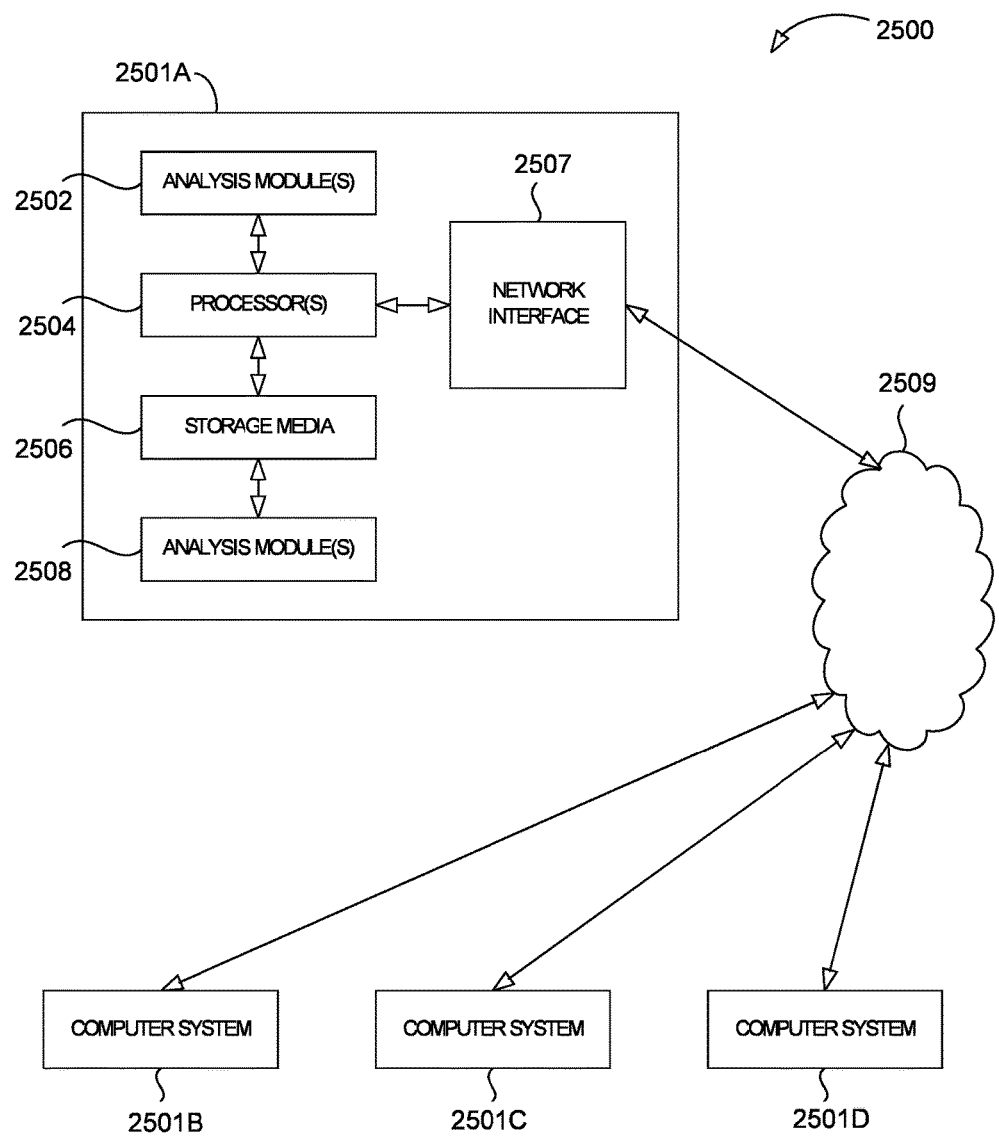
FIG. 26 illustrates an example of a computing system.

In various example embodiments, a method or methods may be executed by a computing device, a computing system, etc. FIG. 26 illustrates an example of a computing system 2600, in accordance with some embodiments. The computing system 2600 may include a computer or computer system 2601A, which may be an individual computer system 2601A or an arrangement of distributed computer systems. The computer system 2601A includes one or more analysis modules 2602 that are configured to perform various tasks according to some embodiments. To perform these various tasks, the analysis module 2602 executes independently, or in coordination with, one or more processors 2604, which is (or are) connected to one or more storage media 2606. The processor(s) 2604 is (or are) also connected to a network interface 2607 to allow the computer system 2601A to communicate over a data network 2609 with one or more additional computer systems and/or computing systems, such as 2601B, 2601C, and/or 2601D (note that computer systems 2601B, 2601C and/or 2601D may or may not share the same architecture as computer system 2601A, and may be located in different physical locations, e.g., computer systems 2601A and 2601B may be located in a processing facility, while in communication with one or more computer systems such as 2601C and/or 2601D that are located in one or more data centers, and/or located in varying countries on different continents).

A processor may include a microprocessor, microcontroller, processor module or subsystem, programmable integrated circuit, programmable gate array, or another control or computing device.

The storage media 2606 may be implemented as one or more computer-readable or machine-readable storage media. Note that while in the example embodiment of FIG. 26 storage media 2606 is depicted as within computer system 2601A, in some embodiments, storage media 2606 may be distributed within and/or across multiple internal and/or external enclosures of computing system 2601A and/or additional computing systems. Storage media 2606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It should be appreciated that computing system 2600 is only one example of a computing system, and that computing system 2600 may have more or fewer components than shown, may combine additional components not depicted in the example embodiment of FIG. 26, and/or computing system 2600 may have a different configuration or arrangement of the components depicted in FIG. 26. The various components shown in FIG. 26 may be implemented in hardware, software, or a combination of both hardware and software, including one or more signal processing and/or application specific integrated circuits.

As an example, one or more methods may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

One may recognize that geologic interpretations, models, and/or other interpretation aids may be refined in an iterative fashion. This may include use of feedback loops executed on an algorithmic basis, such as at a computing device (e.g., computing system 2600, FIG. 26), and/or through manual control by a user who may make determinations regarding whether a given step, action, template, model, or set of curves has become sufficiently accurate for the evaluation of the subsurface three-dimensional geologic formation under consideration.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

Figure 27:
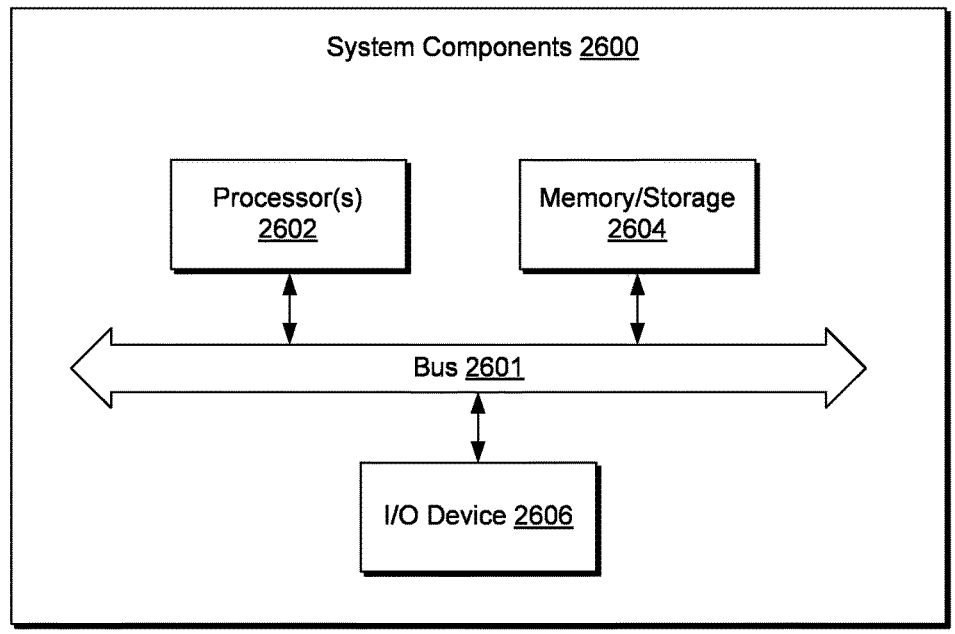
FIG. 27 illustrates example components of a system and a networked system.
Figure 27:
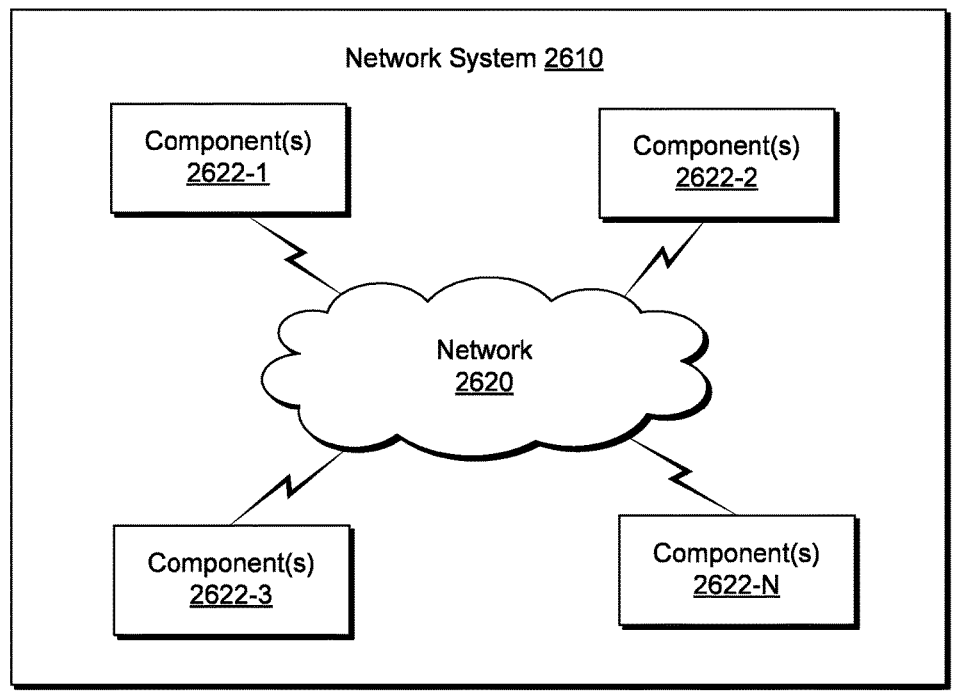

FIG. 27 shows components of an example of a computing system 2700 and an example of a networked system 2710. The system 2700 includes one or more processors 2702, memory and/or storage components 2704, one or more input and/or output devices 2706 and a bus 2708. In an example embodiment, instructions may be stored in one or more computer-readable media (e.g., memory/storage components 2704). Such instructions may be read by one or more processors (e.g., the processor(s) 2702) via a communication bus (e.g., the bus 2708), which may be wired or wireless. The one or more processors may execute such instructions to implement (wholly or in part) one or more attributes (e.g., as part of a method). A user may view output from and interact with a process via an I/O device (e.g., the device 2706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2710. The network system 2710 includes components 2722-1, 2722-2, 2722-3, . . . 2722-N. For example, the components 2722-1 may include the processor(s) 2702 while the component(s) 2722-3 may include memory accessible by the processor(s) 2702. Further, the component(s) 2722 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving information from at least one sensor of a fluid production network for a model of the fluid production network wherein the model comprises a plurality of sub-models;
synchronizing simulation of the plurality of sub-models with respect to time, wherein, during at least a portion of the simulation, a number of time steps for a first one of the sub-models differs from a number of time steps for a second one of the sub-models and an input value of one of the time steps of the first one of the sub-models is determined using at least one output value of at least one of the time steps of the second one of the sub-models;
via synchronizing simulation, outputting values for fluid flow variables of the model; and
based at least in part on one or more of the values for fluid flow variables of the model, outputting a control command to control at least one piece of equipment of the fluid production network.

2. The method of claim 1 wherein the simulation comprises common time points wherein a number of time steps for one of the sub-models differs from a number of time steps for another one of the sub-models at one of the common time points.

3. The method of claim 1 comprising a production model, a pipeline network model and a plurality of well models wherein the pipeline network model is a sub-model of the production model and wherein the plurality of well models are sub-models of the pipeline network model.

4. The method of claim 1 wherein the synchronizing comprises performing the simulation of the plurality of sub-models at least in part in parallel.

5. The method of claim 1 wherein the synchronizing simulation comprises adjusting at least one time step associated with one of the plurality of sub-models.

6. The method of claim 1 wherein at least two of the sub-models are mutually dependent.

7. The method of claim 1 wherein the synchronizing simulation comprises transferring information from one of the sub-models to another one of the sub-models.

8. The method of claim 1 wherein the synchronizing simulation utilizes minor time steps and major time steps.

9. The method of claim 1 wherein the synchronizing simulation comprises time stamping information generated by sub-model simulation.

10. The method of claim 1 wherein the synchronizing simulation comprises storing values for fluid flow variables for at least two times and interpolating the values with respect to time.

11. The method of claim 1 wherein the input value of one of the time steps of the first one of the sub-models is determined via interpolation using output values of a plurality of time steps of the second one of the sub-models.

12. A system comprising:
an interface;
a processor;
memory accessible by the processor; and
processor-executable instructions stored in the memory wherein the instructions comprise instructions to instruct the system to
receive, via the interface, information from at least one sensor of a fluid production network for a model of the fluid production network wherein the model comprises a plurality of sub-models;
synchronize simulation of the plurality of sub-models with respect to time wherein, during at least a portion of the simulation, a number of time steps for a first one of the sub-models differs from a number of time steps for a second one of the sub-models and an input value of one of the time steps of the first one of the sub-models is determined using at least one output value of at least one of the time steps of the second one of the sub-models;
via the simulation, output values for fluid flow variables of the model; and
based at least in part on one or more of the values for fluid flow variables of the model, output a control command to control at least one piece of equipment of the fluid production network.

13. The system of claim 12 wherein the processor-executable instructions comprise instructions to instruct the system to implement a scheduler.

14. The system of claim 12 wherein the input value of one of the time steps of the first one of the sub-models is determined via interpolation using output values of a plurality of time steps of the second one of the sub-models.

15. One or more non-transitory computer-readable storage media comprising computer-executable instructions executable by a computer, the instructions comprising instructions to:
receive information from at least one sensor of a fluid production network for a model of the fluid production network wherein the model comprises a plurality of sub-models;
synchronize simulation of the plurality of sub-models with respect to time wherein, during at least a portion of the simulation, a number of time steps for a first one of the sub-models differs from a number of time steps for a second one of the sub-models and an input value of one of the time steps of the first one of the sub-models is determined using at least one output value of at least one of the time steps of the second one of the sub-models;
via the simulation, output values for fluid flow variables of the model; and
based at least in part on one or more of the values for fluid flow variables of the model, output a control command to control at least one piece of equipment of the fluid production network.

16. The one or more non-transitory computer-readable storage media of claim 15 wherein the fluid production network comprises a substantially vertical conduit and a substantially horizontal conduit and wherein a time step for simulation of fluid flow in the substantially vertical conduit is less than a time step for simulation of fluid flow in the substantially horizontal conduit.

17. The one or more non-transitory computer-readable storage media of claim 15 wherein the fluid production network comprises a multiphase fluid production network.

18. The one or more non-transitory computer-readable storage media of claim 15 wherein the values comprise values for fluid flow variables at a plurality of different times.

19. The one or more non-transitory computer-readable storage media of claim 15 wherein the input value of one of the time steps of the first one of the sub-models is determined via interpolation using output values of a plurality of time steps of the second one of the sub-models.

* * * * *